United States Patent [19]
Ishiyama et al.

[11] Patent Number: 5,477,388
[45] Date of Patent: Dec. 19, 1995

[54] INVERSE TELESCOPIC WIDE ANGLE LENS

[75] Inventors: Toshiro Ishiyama, Tokyo; Yutaka Suenaga, Yokohama; Yoshiyuki Shimizu, Miura, all of Japan

[73] Assignee: Nikon corporation, Tokyo, Japan

[21] Appl. No.: 200,459

[22] Filed: Feb. 23, 1994

Related U.S. Application Data

[63] Continuation-in-part of Ser. No. 93,727, Jul. 20, 1993, which is a continuation of Ser. No. 931,347, Aug. 18, 1992, abandoned.

[30] Foreign Application Priority Data

Aug. 20, 1991 [JP] Japan .................................. 3-207704
Oct. 25, 1991 [JP] Japan .................................. 3-306683
Feb. 26, 1993 [JP] Japan .................................. 5-037216

[51] Int. Cl.$^6$ ........................................................ G02B 13/04
[52] U.S. Cl. ........................ 359/749; 359/682; 359/708; 359/740; 359/751
[58] Field of Search .................................. 359/680–682, 359/686–687, 689, 708–717, 739, 740, 749–753,761, 770, 781–784, 785, 793–794

[56] References Cited

U.S. PATENT DOCUMENTS

| | | | |
|---|---|---|---|
| 3,663,095 | 5/1972 | Mori | 359/749 |
| 4,111,558 | 9/1978 | Ikemori | 359/750 |
| 5,170,292 | 12/1992 | Yamanashi | 359/686 |
| 5,184,251 | 2/1993 | Tsuchida et al. | 359/686 |

FOREIGN PATENT DOCUMENTS 62-78520  4/1987  Japan.

Primary Examiner—Paul M. Dzierzynski
Assistant Examiner—James Phan
Attorney, Agent, or Firm—Shapiro and Shapiro

[57] ABSTRACT

An inverse telescopic wide angle lens comprises a diaphragm; a front lens group of an integral positive or negative refractive power, positioned in the object side in front of the diaphragm and having a first lens group of a negative refractive power including a negative lens of which an image-side air-contacting surface is formed as an aspherical surface concave to the image side, and a second lens group of a positive refractive power positioned between the first lens group and the diaphragm; and a rear lens group of an integral positive refractive power, positioned behind the diaphragm and having plural lenses. The negative lens in the first lens group is so constructed that the absolute value of the refractive power of the concave surface on the optical axis is larger than that of the refractive power of the surface at the object side on the optical axis, that the curvature of the concave surface decreases monotonously with the distance from the optical axis, and that the form of the concave surface of the negative lens at the image side satisfies a particular condition. The effective diameter of the lens closest to the object in the first lens group is so constructed as to satisfy a particular condition.

17 Claims, 18 Drawing Sheets

SPHERICAL ABERRATION

ASTIGMATISM

DISTORTIONAL ABERRATION

SPHERICAL ABERRATION

ASTIGMATISM

DISTORTIONAL ABERRATION

FIG. 5
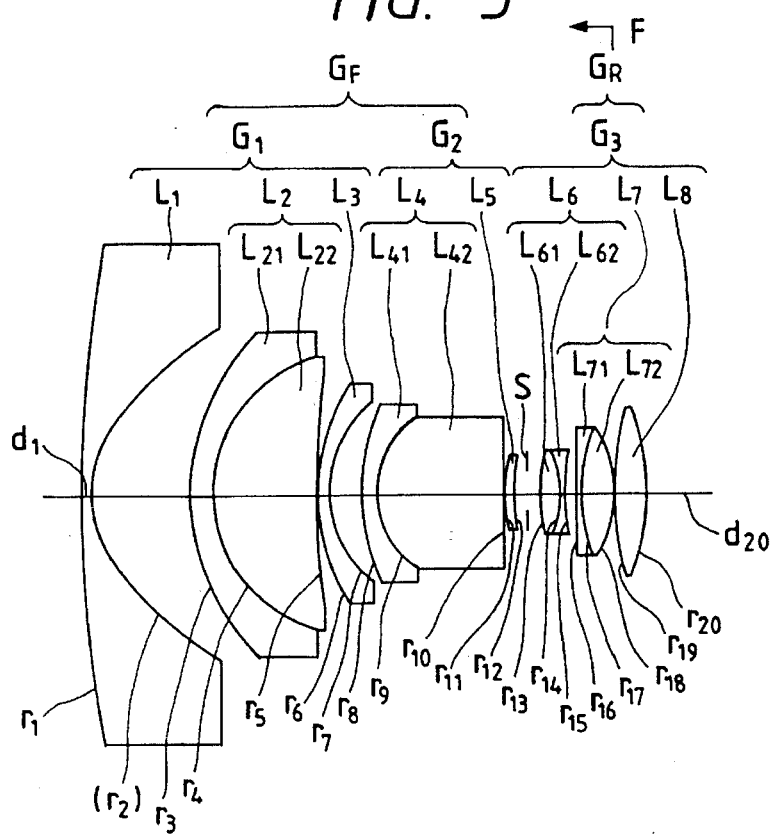
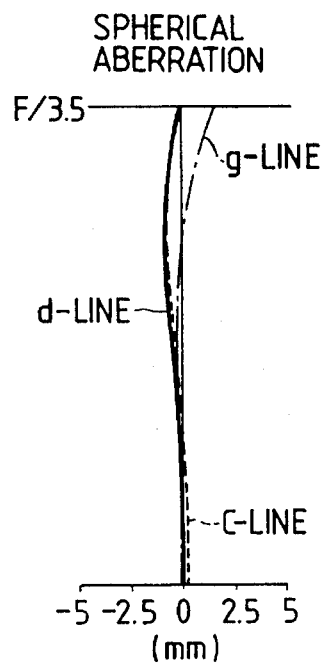
FIG. 6A
SPHERICAL
ABERRATION
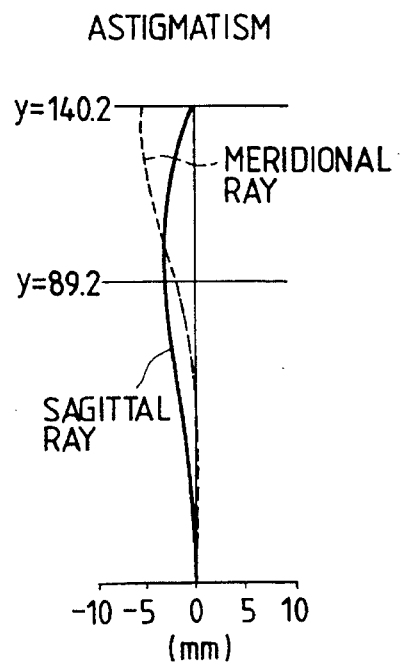
FIG. 6B
ASTIGMATISM
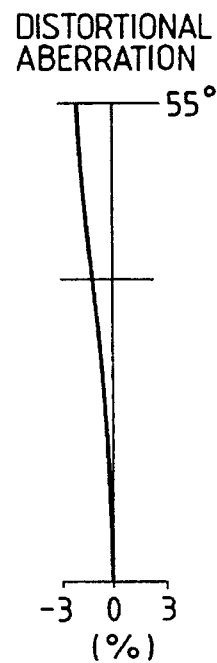
FIG. 6C
DISTORTIONAL
ABERRATION

SPHERICAL ABERRATION

ASTIGMATISM

DISTORTIONAL ABERRATION

SPHERICAL ABERRATION

ASTIGMATISM

DISTORTIONAL ABERRATION

SPHERICAL ABERRATION

ASTIGMATISM

DISTORTIONAL ABERRATION

SPHERICAL ABERRATION

ASTIGMATISM

DISTORTIONAL ABERRATION

SPHERICAL ABERRATION

ASTIGMATISM

DISTORTIONAL ABERRATION

SPHERICAL ABERRATION

ASTIGMATISM

DISTORTIONAL ABERRATION

SPHERICAL ABERRATION
F/3.50

ASTIGMATISM

DISTORTIONAL ABERRATION

SPHERICAL ABERRATION
N.A.=0.0104

C-LINE
d-LINE
-2.5  0  2.5
(mm)

ASTIGMATISM
Y=135.4

MERIDIONAL RAY
g-LINE
SAGITTAL RAY
Y=86.8

-5  0  5
(mm)

DISTORTIONAL ABERRATION
Y=135.4

Y=86.8

-3  0  3
(%)

SPHERICAL ABERRATION
F/3.50

ASTIGMATISM

DISTORTIONAL ABERRATION

SPHERICAL ABERRATION
N.A.=0.0105

ASTIGMATISM

DISTORTIONAL ABERRATION

SPHERICAL ABERRATION

ASTIGMATISM

DISTORTIONAL ABERRATION

SPHERICAL ABERRATION

N.A.= 0.0134 g-LINE
d-LINE
C-LINE

-2.5 0 2.5
(mm)

ASTIGMATISM

Y=136.2

MERIDIONAL RAY
Y=86.8
SAGITTAL RAY

-5 0 5
(mm)

DISTORTIONAL ABERRATION

Y=136.2

Y=86.8

-3 0 3
(%)

*ASPHERIC SURFACE

*ASPHERIC SURFACE

*ASPHERIC SURFACE

*ASPHERIC SURFACE

INVERSE TELESCOPIC WIDE ANGLE LENS

This is a continuation-in-part application of U.S. patent application Ser. No. 093,727 filed Jul. 20, 1993, which is a continuation of Ser. No. 931,347 filed Aug. 18, 1992, abandoned.

BACKGROUND OF THE INVENTION

1. Field of the Invention

The present invention relates to an inverse telescopic wide angle lens, and more particularly to an inverse telescopic wide angle lens capable of providing an ultra wide image angle adapted for use as a photographic lens and having a rear focal length larger than the focal length of the lens system.

2. Related Background Art

In the field of inverse telescopic wide angle lens having a front lens group of a negative power in front of a rear lens group of a positive power, there have been made various proposals and various types are already known, as exemplified by a configuration disclosed in the U.S. Pat. No. 3,663,095. In such inverse telescopic wide angle lens, the negative refractive power of the front lens group is required for obtaining a rear focal length larger than the focal length, but has the effect of increasing the image angle to the rear positive lens group, thus bringing the curvature of image plane and the Petzval's sum to the negative side. However such negative refractive power can improve the lens performance in a lens system in which the ratio of the rear focal distance to the focal length is not so large.

Nevertheless, in an ultra wide angle lens with an image angle of 80°, 100° or even larger in which the distortion aberration, astigmatism or coma aberration is difficult to correct because of the asymmetric structure of the lens system itself and a relatively long rear focal length is required for this reason, the undesirable effect of the negative refractive power of the front lens group appears evidently in the excessively negative distortion and Petzval's sum and in the distortion in the coma aberration. Also in general, in order to minimize the negative distortion generated by a negative meniscus lens generally contained in the front lens group of negative retractive power, also to maintain a satisfactory image plane and to reduce the spherical aberration of the pupil, the lens bendings have to be so designed that the principal ray passes through the negative meniscus lens at about the minimum deviation angle.

However, a negative coma aberration is also generated by the concave face of the negative lens. In particular a large negative coma aberration is generated for the lights outside the principal ray, and the correction therefor becomes a significant burden for the lens designing. On the other hand, a modification in the lens bending for reducing said negative coma aberration will result in other drawbacks such as an increased distortion.

On the other hand, the aberrations other than the distortion can be reduced by increasing the dimension of the lens system, particularly the front lens group. Such proportional enlargement of the lens allows to use the light relatively close to the principal ray, thereby reducing the coma aberration. However such method is basically incapable of correcting the distortion aberration, because the distortion is represented by the ratio of the height of the ideal image point to that of the actual image point and does not change by the proportional enlargement of the lens is the image angle remains same, unless the path of the principal ray is varied.

Thus the proportional enlargement of the lens is basically ineffective for the correction of distortion, though it is effective for the correction of coma or image plane curvature. This fact will be readily understood by a wide angle conversion system, which, when magnified in dimension, can improve the spherical aberration and the coma aberration though it does not vary the magnification or the distortion.

However such proportional enlargement of the lens tends to render the lens bulky, though the ease of correction of coma and image plane curvature is advantageous for the correction of distortion in the lens designing. Also a positive lens is often placed close to the negative lens for the purpose of correcting the distortion, and thus configuration tends to further increase the dimension of the lens system.

Also the use of an aspherical face (i.e., surface) for correcting the distortion is already known, and there is already known a system employing an aspherical convex face in the negative meniscus lens of the front lens group of negative refractive power, for the purpose of said correction. Although such configuration is effective to a certain extent, such aspherical face only plays an auxiliary role in the optical system consisting of spherical faces only, and is insufficient when the image angle becomes wider. For example a lens system with an image angle of 100° or larger is difficult to design, and the configuration of the lens system becomes inevitably complex by the above-mentioned conventional methods. Also the dimension of the lens tends to become larger in the axial and radial directions.

On the other hand, the focusing of a phototaking lens has generally been conducted by the movement of the entire lens system, but there are also known other methods, such as a method of moving a front lens group, positioned closest to the object, as employed in zoom lenses, and a method of fixing the front lens group relative to the image plane and moving a rear lens group together with a diaphragm, as employed in telephoto lenses.

However, the method of moving the entire lens system or the front lens group is associated with draqbacks of requiring a large and complex moving mechanism and of a slow response speed in focusing. Also the method of moving the rear lens group is not free from the drawbacks of complex lens moving mechanism and slow response in focusing, because an automatic diaphragm control mechanism is recently attached to the diaphragm, for achieving automatic exposure.

In this connection, in the conventional inverse telescopic wide angle lens, there is known a focusing method of moving the entire lens system and simultaneously varying appropriate one of the air gaps separating the component lenses. However such focusing method is equivalent to the conventional general focusing method in that the entire lens system has to be moved. Also the variation in the air gap separating the component lenses is to correct the movement of the image plane to the positive direction when the lens is focused to an object of a short distance, and is not intended for focusing.

SUMMARY OF THE INVENTION

In consideration of the foregoing, an object of the present invention is to provide an inverse telescopic wide angle lens capable of eliminating the above-mentioned drawbacks of the conventional wide angle lenses, simplifying the lens configuration thereby reducing the dimension of the lens, correcting various aberrations in satisfactory manner, and still extending the rear focus length.

Another object of the present invention is to provide an inverse telescopic wide angle lens in which a relatively small rear lens group, positioned behind the diaphragm, is rendered movable for focusing, wherein rapid focusing is rendered possible with satisfactorily small aberrations.

The above-mentioned objects can be attained, according to the present invention, by a wide angle lens comprising a diaphragm; a front lens group, composed of a first lens group of a negative refractive power positioned in front of said diaphragm and a second lens group of a positive power positioned between said first lens group and said diaphragm, and having a positive or negative integral refractive power; and a rear lens group positioned behind said diaphragm, composed of plural lenses and having a positive integral refractive power. Said first lens group of negative power includes at least a negative lens of which an air-contacting surface at the diaphragm side is formed as an aspherical surface concave to the diaphragm side, and said negative lens is so designed that the absolute value of the power of said concave surface on the optical axis is larger than that of the power of the front surface of said lens on the optical axis. Furthermore the curvature of the concave surface of said negative lens is so designed as to monotonously decrease with the distance from the optical axis, and said concave surface at the diaphragm side of said negative lens, when represented by a polynomial:

$$x=Cy^2/\{(1+(1-_\kappa C^2 y^2)^{1/2}\}+C_4 y^4+C_6 y^6+\ldots$$

defining the axial distance x from the center of the concave face at a distance y from the optical axis, with a curvature C at said center of the concave surface, aspherical constants $C_4, C_6, \ldots$ and a conical constant $\kappa$, is so designed that said conical constant $\kappa$ satisfies the following relation:

$$-5<\kappa<0.5.$$

Also the effective diameter $\phi$ of the frontmost lens, closest to the object, in the first lens group is so designed as to satisfy the following condition:

$$\phi<4\cdot f\cdot\tan\theta$$

wherein f is the focal length of the entire system, and $\theta$ is the half image angle.

Furthermore the focal length $f_1$ of the first lens group preferably satisfies the following condition:

$$0.4<|f_1/f|<2.0.$$

Furthermore the lens system is preferably so constructed that the front lens group is fixed relative to the image plane and the rear lens group is rendered movable wholly or partly for focusing.

In the present invention, in order to sufficiently correct the distortion aberration and to reduce the lens diameter, while maintaining other aberrations at satisfactory levels, the aforementioned aspherical face is preferably so constructed as to satisfy the following condition:

$$0.8<|h_p/r_A|<1.5$$

wherein $r_A$ is the paraxial radius of curvature of the aspherical face and $h_p$ is the height, from the optical axis, of the crossing position of the principal ray in the maximum image angle with said aspherical face.

This evaluation value defines the extent of use of the aspherical face, or the level of asphericity, namely the amount of discrepancy from the spherical face. This value does not exceed unity in the spherical system. Stated differently, as this evaluation value becomes larger, the asphericity of the face becomes higher. This condition is required for effectively utilizing an aspherical face in an inverse telescopic wide angle lens with a large rear focal length. Above the upper limit of this condition, the refractive force of the first lens group G1 becomes excessively strong in relative manner, so that the image plane curvature and the astigmatism become difficult to correct in satisfactory manner. Otherwise, the entrance pupil becomes separated from the first lens, so that it becomes difficult to reduce the lens diameter. On the other hand, below the lower limit, the distortion aberration cannot be corrected satisfactorily, as the level of asphericity becomes smaller.

The wide angle lens of the present invention of the above-explained configuration does not require the addition of a positive lens for correcting the distortion, since the concave surface, at the diaphragm side, of a negative lens in the first lens group is formed as an aspherical surface of which curvature decreases monotonously with the distance from the optical axis. Consequently the lens system can be simplified in the configuration, and made smaller in the dimension of the lens system. Also rapid focusing is possible with a simple focusing mechanism and with satisfactory aberrations, by a configuration in which the rear lens group is rendered movable wholly or partly for focusing.

Still other objects of the present invention, and the features and advantages thereof, will become fully apparent from the following detailed description to be taken in conjunction with the appended drawings.

BRIEF DESCRIPTION OF THE DRAWINGS

FIG. 5 is a view showing lens configuration of a 3rd embodiment of the present invention;

FIGS. 6A, 6B and 6C are aberration charts of said 3rd embodiment;

DESCRIPTION OF THE PREFERRED EMBODIMENTS

Figure 1:
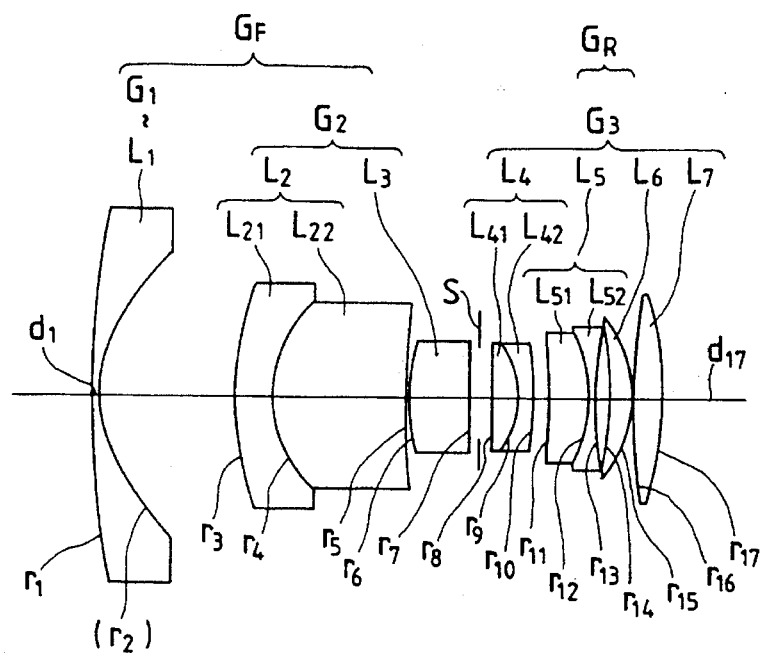
FIG. 1 is a view showing lens configuration of a 1st embodiment of the present invention.

Now the present invention will be clarified in detail by embodiments thereof shown in the appended drawings.

FIGS. 1, 3, 5, 7, 9 and 11 are cross sectional views showing the lens configuration of different embodiments of the present invention, and FIGS. 13, 17, 20 and 23 are views showing the lens configuration of embodiments of the present invention in focused state.

As shown in these drawings, the wide angle lens of the present invention consists of a diaphragm S, a front lens group $G_F$ of a positive or negative refractive power positioned in front of said diaphragm S, and a rear lens group $G_R$ of a positive refractive power positioned behind said diaphragm S. Said front lens group $G_F$ is composed, in the order from the object side, of a first lens group $G_1$ of a negative power, including a negative lens $L_1$ of which rear surface contacting the air at the diaphragm side is formed as an aspherical concave surface, and a second lens group $G_2$ of a positive power, positioned between said first lens group $G_1$ and the diaphragm S. The rear lens group $G_R$ is composed of a third lens group $G_3$ consisting of plural lenses and having integrally a positive power.

Said aspherical negative lens $L_1$ (hereinafter simply referred to as "negative lens $L_1$") of the first lens group $G_1$ is so constructed that the absolute value of the power of its concave surface on the optical axis is larger than that of the power of the front face of the aspherical lens $L_1$ on the optical axis, and that the curvature of said concave surface decreases monotonously with the distance from the optical axis. Besides the concave surface of said negative lens, when represented by a polynomial:

$$x = C_y^2 / \{1 + (1 - \kappa C^2 y^2)^{1/2}\} + C_4 y^4 + C_6 y^6 + \ldots \quad (A)$$

defining the axial distance x from the center of said concave face as a function of the distance y from the optical axis, with a curvature C at said center, and with constance $C_4$, $C_6$, ... and a conical constant $\kappa$, is so designed that said conical constant $\kappa$ satisfies a condition:

$$-5 < \kappa < 0.5 \quad (1)$$

Also the effective diameter $\phi$ of the lens closest to the object in the entire lens system is so designed as to satisfy the following condition (2):

$$\phi < 4 \cdot f \cdot \tan\theta \quad (2)$$

wherein f is the focal length of the entire system, and $\theta$ is the half image angle.

Furthermore, the focal length $f_1$ of the first lens group preferably satisfies the following condition (3):

$$0.4 < |f_1/f| < 2.0 \quad (3)$$

In the following there will be explained the principle of correction of aberrations in the present invention, with reference to FIGS. 1 and 3.

Firstly, the aforementioned coma and distortion result from a constant curvature of the lens face. The wide angle lens of the present invention is constructed as an inverse telescopic wide angle lens, in which the first lens group $G_1$ of a negative power is positioned in front, in order to obtain a long rear focal length. In the present invention, therefore, the above-mentioned distortion and coma are alleviated by forming the air-contacting concave face, at the image side or at the diaphragm side, of the negative lens L1 closest to the object side in the first lens group $G_1$, as an aspherical surface of which curvature monotonously decreases with the distance from the optical axis.

Conventionally, in order to correct the distortion aberration resulting from a front negative lens provided for obtaining a large rear focal length, there has been positioned a positive lens principally for correcting said distortion, in the vicinity of said negative lens. Thus a combination of positive and negative lenses has been employed for correcting the distortion aberration and realizing a lens with a synthesized negative power. Such method, however, is basically ineconomical because the necessary negative power is partially cancelled by the positive power, and is consequently associated with a drawback of requiring lenses of a larger diameter. In contrast, the negative lens $L_1$ designed according to the present invention reduces the negative distortion aberration and provides a larger rear focal length, as it is less necessary to cancel the power of said negative lens $L_1$ with a positive lens.

Stated differently, the lens action achieved in the conventional lens system by the combination of positive and negative lenses is attained in the present invention by a single negative lens $L_1$. Also in the wide angle lens of the present invention, the negative coma aberration generated by the front lens group $G_1$ of negative power is significantly less than in the system with spherical lenses only.

In the following there will be explained the effect of the aforementioned condition (1) satisfied by the concave face of the negative lens $L_1$. Although said concave face is aspherical, it can be defined by a two-dimensional curve in the meridional cross section as the lens is rotationally symmetric about the optical axis. In general a second-order curve has two focal points, and becomes a circle if said focal points mutually coincide; an oval if two focal points are present on the same side of the curve; a parabola if one of the focal points is at infinity; or a hyperbola if the focal points are mutually on different sides of the curve.

Among these curves, the monotonous decrease in curvature as a function of the distance from the optical axis occurs in the oval, hyperbola and parabola, but, in case of oval, the longer axis has to coincide with the optical axis. The hyperbola has linear asymtotic lines and shows little change in the curvature in a position sufficiently distant from the optical axis. In approximation, the hyperbola can be considered as a concave conical form, and this is not desirable because the deviation angles to principal rays of different inclinations become approximately same. Consequently a hyperbolic plane is not suitable for use in a position distant-from the diaphragm, in a wide angle lens requiring a large image angle, except for a region not to close to the asymtotic line. For these reasons, the curve adapted for use in the concave face of the negative lens $L_1$ is an elliptic curve of which longer axis coincides with the optical axis or a parabolic curve, or a hyperbolic curve if limited to a region relative close to the optical axis.

In optical designing, the aspherical face is generally represented, in the form in the meridional plane, by the aforementioned polynomial (A). In the right hand side, the first term represents a second-order curve, and the conical constant $\kappa$ is a parameter determining the shape thereof. More specifically, there is given a hyperbola if $\kappa$ is negative; a parabola if $\kappa$ is 0; an ellipse if $\kappa$ is between 0 and 1; or a circle if $\kappa$ is 1. Said polynomial may include a second-order term of y in the right-hand side, but such term overlaps with the first term. Consequently said polynomial lacking such second-order term of y can still represent the identical curve as in the polynomial including such second-order term.

Since the curve adapted for use in the concave face of the negative lens $L_1$ is an ellipse with the longer axis coinciding with the optical axis, or a parabola, or a hyperbola within a region relatively close to the optical axis, as explained above, the above-mentioned parameter $\kappa$ can lie within a region:

$$-\infty < \kappa < 1.$$

However, if $\kappa$ is close to 1, the obtained curve becomes close to circle, exhibiting little effect of the aspherical surface. Also at $-\infty$, the obtained curve becomes close to a cone, unsuitable for a lens. Therefore, in the present invention, the foregoing condition (1) is applied for defining the range of the conical constant $\kappa$.

Below the lower limit of the condition (1), the substantially linear portion increases in the hyperbola within the effective diameter of the lens. Consequently the curved face becomes close to a cone, with an excessive difference in curvature between the center and the peripheral area and with a limited difference in curvature between the intermediate area and the peripheral area, thus giving rise to large image plane curvature and distortion which are difficult to correct. On the other hand, if $\kappa$ is close to 1, the curve becomes close to a circle as explained before. Such curve is more advantageous in correction of aberrations than the conventional spherical system, but the effect of asphericity is limited. Also the curve is no longer second order if the second and subsequent terms are included in the polynomial (A). It is still possible to modify the curve by adding the higher-order terms of y under the conditions that the obtained curve is positioned between two curves defined by the upper and lower limits of $\kappa$ in the condition (1) and that the curvature decreases monotonously with the distance y from the optical axis. It is naturally possible also to add higher-order terms of y to the object-side face of said negative lens $L_1$, having the above-mentioned aspherical face at the diaphragm side, thereby employing aspherical faces on both sides.

The second lens group $G_2$ of a positive power, positioned in front of the diaphragm S, is constructed in the following manner. Said second lens group $G_2$ has a deficient axial color aberration, which is advantageous in correcting a magnification color aberration, often generated in the front first lens group $G_1$ of a negative power. In the conventional system consisting only of spherical faces, the front first lens group $G_1$ of a negative power often shows a positive image plane curvature, partly because the lights entering outside the principal ray show a negative coma aberration. The second lens group $G_2$ is important in correcting said coma aberration to the positive side.

In the conventional inverse telescopic lenses there have been taken various measures such as (a) increasing the effective diameter of the front negative lens, (b) increasing the power of the rear positive lens, or (c) bending the fornt negative lens toward the object side. In the lens system of the present invention, however, the first lens group $G_1$ of a negative power generates only limited negative coma aberration, and, particularly for the light entering outside the principal ray, there is often generated a positive coma, contrary to the system consisting of the spherical faces only. Consequently it is often desirable to generate a negative coma aberration in the second lens group $G_2$ immediately in front of the diaphragm S, in order to correct the positive coma resulting from the first lens group $G_1$ positioned in front. This is achievable within the prior technology known to those skilled in the art, such as forming an adhered face with a negative power in the second lens group $G_2$. This method of forming an adhered face with a negative power often has an effect of shifting the Petzval's sum to the positive side, thereby cancelling the tendency of the first lens group $G_1$ of a negative power to shift the Petzval's sum to the negative side and maintaining the overall aberrations in satisfactory state. This method is also effective for correcting the spherical aberration which tends to be shifted to the negative side, in comparison with that in the spherical system. It is furthermore desirable to select dispersions $v_n$, $v_p$ of the negative and positive lenses in front of the diaphragm so as to satisfy a relation $v_n > v_p$, in order to correct the color aberration.

The third lens group $G_3$ behind the diaphragm S is constructed in the following manner. Said third lens group $G_3$ has to include at least a positive lens and a negative lens, or at least two lenses in total, in order to correct the spherical and color aberrations and the coma aberration of the light entering inside the principal ray. A larger number of lenses are naturally required in this third lens group $G_3$, when the aperture of the entire lens system becomes larger. It preferably contains an air-contacting concave face at the image side, in order to correct the tendency, to induce internal coma aberration, of the light entering inside the principal ray and to obtain a flat image plane.

Finally there will be explained the aforementioned condition (2) related to the effective diameter of the lens closest to the object in the entire lens system.

In general, the effective diameter φ of the lens closest to the object can be considered the largest effective diameter in the entire lens system. In the present invention, the negative lens $L_1$ in the first lens group $G_1$ has an aspherical concave face as explained above, so that the addition of a positive lens principally for correcting the distortion aberration is unnecessary. For this reason the lens configuration can be made simpler, and the maximum effective diameter φ can be maintained within the condition (2). The volume of the lens system can thus be reduced also.

Also for realizing a lens with such compact effective diameter, the refractive power in the first lens group $G_1$ is preferably so distributed as to satisfy the aforementioned condition (3). Said condition (3) is to optimize the image angle and the pupil position in order to reduce the effective diameter as mentioned above. More specifically, the negative refractive power of the first lens group $G_1$ is made strong within a range permissible by the Petzval's sum, thereby sufficiently refracting the oblique light of a desired image angle. It is thus rendered possible to position the entrance pupil at the object side as far as possible, and to minimize the aberrations when the negative lens $L_1$, positioned closest to the object in the first lens group $G_1$, has a parabolic concave face at the image side.

In the following there will be explained the focusing function of the inverse telescopic wide angle lens of the present invention, with reference to FIG. 13. According to the present invention, the entire lens system is divided, by an air gap including the diaphragm S, into two lens groups $G_F$, $G_R$. It is easy to focus the lens to the objects of different distances, if limited to a near-axis region, by dividing the entire lens system into front and rear groups by a suitable air gap and moving only one of said groups along the optical axis. It is however difficult to establish a designing principle for obtaining a lens system capable of maintaining stable and satisfactory performance regardless of the object distance, in consideration of the aberrations and outside the near-axial region. This will be considered further in the following.

At first let us consider a situation in which the light passing through the front lens group $G_F$, among the above-mentioned two groups separated by the air gap, does not have aberrations. Since it is assumed that the light passing through the entire system does not contain aberrations, the rear lens group $G_R$ does not generate aberrations. Consequently the possibility of generation of aberrations is low in the focusing operation by the movement of either one of the front lens group $G_F$ and the rear lens group $G_R$.

There is next considered a situation in which the front lens group $G_F$ has image plane curvature but does not show coma aberration. In this situation, because of absence of the coma, there should not be variation in the meridional image plane even if the height of the principal ray varies slightly. Since it is assumed that the aberrations in the light passing through the front lens group $G_F$ are corrected in passing the rear lens group $G_R$ whereby a satisfactory image is formed on the image place, the aberrations of the rear lens group $G_R$ should be in a state of cancelling the aberrations of the front lens group $G_F$. Consequently the rear lens group $G_R$ should have image plane curvature in a direction opposite to that of the front lens group $G_F$, and is free from the coma aberration.

Also in this case, the change in the aberrations of the final image, resulting from the change in the air gap between the front and rear lens groups, is considered small, because a slight change in the height of the principal ray entering the rear lens group $G_R$, resulting from said change in the air gap, generate little changes in the aberrations. Also since the variation in the air gap does not vary the Petzval's sum, there should be little change in the meridional image plane, so that the resulting variation in the sagittal image plane should also be small. Furthermore, in this case, the light beam passing between the front lens group $G_F$ and the rear lens group $G_R$ is preferably close to parallel state, since, if the light beam emerging from the front lens group $G_F$ is significantly diverging or converging, there will result a change in the light path by said change in the air gap, eventually leading to a significant change in the aberrations.

A parallel or nearly parallel light beam can be obtained from the fornt lens group $G_F$, in case of infinite object distance, if the front lens group $G_F$ is an afocal system or has a large focal distance. Therefore, if the front lens group $G_F$ is moved for focusing, the required amount of movement is anticipated to become very large. As the object distance is sufficiently large in most cases in the photographic lenses, the focusing can be achieved more advantageously by the rear lens group $G_R$, than the front lens group $G_F$ requiring a larger amount of movement. For this reason the focusing operation in the present invention is achieved by the movement of the rear lens group $G_R$ or a part thereof, as shown in FIG. 13.

In the following there will be considered a method for obtaining a front lens group $G_F$ which may exhibit image plane curvature but is free from coma aberration. In general, in the inverse telescopic wide angle lens, the front lens group of a negative refractive power, positioned in front of the diaphragm, is known to generate negative coma aberration, in relation to the correction of the distortion. One of the reasons for this phenomenon is the excessive refraction, by the concave face, of the light entering outside the principal ray, as the conventional lens is composed of spherical faces with a constant curvature. This tendency becomes rapidly marked as the lens system is made smaller, and the correction therefor is not easy within the front lens group of a negative refractive power, positioned in front of the diaphragm. It is however possible to simultaneously correct the distortion and the coma aberration, by employing an aspherical face of which curvature monotonously decreases with the distance from the optical axis, in an air-contacting face concave to the image plane, in a lens group of a negative refractive power in the front lens group. Nevertheless the image plane curvature cannot be corrected in this method and will be corrected by the rear lens group through the application of an already known technology.

In the aspherical face to be employed in the present invention, as will be shown in the 11th to 14th embodiments to be explained later, the value κ within a range:

$$-1<\kappa<0.8$$

is effective for reducing the lens aperture while correcting the distortion aberration.

If the second and ensuing terms are included in the foregoing definition of the aspherical face, the shape of the face varies and becomes a non-second-order curved face, which however is present between two curves defined by the above-mentioned range of κ. Thus the curvature may be corrected, if necessary, by the addition of terms of higher order, under the condition of monotonous increase of curvature as a function of the distance from the optical axis. Naturally such terms of higher order may be added to the face, at the object side, of the lens having the above-mentioned aspherical face.

It is preferable to maintain the ratio of the focal length $-f_1$ of the negative meniscus lens having the aspherical lens, to the focal length f of the entire system, within the following range:

$0.7<|f_1/f|<1.28$

Furthermore, for obtaining a lens with a small effective diameter, there is preferably satisfied the following condition:

$\phi<3.3 \cdot f \cdot \tan^2\theta$ wherein $\phi$ is the effective diameter on a plane tangential to the top point of the lens face closest to the object, and $\theta$ is the half image angle.

In the following there will be given an explanation on the rear lens group including the diaphragm. As explained before, the rear lens group is composed, across the diaphragm, a 2nd lens group G2 of a positive refractive power and a 3rd lens group G3 of also a positive refractive power. The 2nd lens group G2, positioned closer to the object than the diaphragm and having a positive refractive power, is somewhat insufficiently corrected for the axial color aberration. This fact is advantageous for correcting the magnification color aberration, which tends to appear in the 1st lens group G1 of a negative refractive power, positioned closest to the object. In the conventional wide angle lens composed solely of spherical faces, a lens group of a negative refractive power at the object side tends to generate a positive image plane curvature, partly because the ray entering outside the principal ray generates a negative coma aberration. Consequently this 2nd lens group G2 has an important role of correcting the above-mentioned coma aberration toward the positive side and also correcting the image plane curvature to the negative side. In the conventional lens systems, there have been tried various measures such as increasing the size of the negative lens in front, or increasing the power of the positive lens, or adopting, in said positive lens, a bending form with a strongly convex face toward the object.

Presence of the above-mentioned concave aspherical face of the present invention reduces the negative coma aberration in the first lens group G1 of negative refractive power, and often generates, inversely, a positive coma aberration. Consequently the 2nd lens group G2 in front of the diaphragm is often required to generate a negative coma aberration, in order to compensate the positive coma aberration of the 1st lens group G1. This is achievable, as shown in the following embodiments of the present invention, by an adhered face of a negative refractive power or within the already known technology easily available to those skilled in the art. Such technology, such as the adhered face of a negative refractive power, at the same time tends to modify the Petzval's sum toward the positive direction, thereby cancelling the effect of the front lens group of negative refractive power to modify the Petzval's sum toward the negative direction, and thus maintaining the aberrations of the entire system at a satisfactory level. Besides this is effective also for correcting the spherical aberration, which tends to become more negative in comparison with the case of a system composed solely of spherical faces.

In the following there will be given an explanation on the 3rd lens group G3 positioned behind the diaphragm. The lens group positioned behind the diaphragm has to include at least two lenses, or at least one each of positive and negative lenses, in order to correct the spherical aberration, the color aberration and the coma aberration of the ray entering inside the principal ray. A larger number of lenses are naturally required in this group, when the entire lens system becomes larger in aperture. Also in order to obtain a flat image plane by correcting the tendency of the ray, entering inside the principal ray, to generate inward coma aberration, there is preferably included an air-contacting face concave to the image side, and an air lens formed by said face and a succeeding face is preferably of a biconvex form.

Furthermore, in the above-explained configuration of the present invention, in order to maintain a large aperture ratio of F-number 2.0 or less, there is preferably provided an aspherical face in the 3rd lens group G3 positioned behind the diaphragm. For correcting the spherical aberration depending on the aperture, said aspherical face is preferably provided at a position, closest to the object side, of the 3rd lens group G3, namely a position closest to the diaphragm. Furthermore, in order to also correct the off-axial aberrations, it is effective to provide an aspherical face at a position slightly closer to the image side from the diaphragm. The basic form of the aspherical face in this case is effectively composed of a spherical face at the top point.

In the following, embodiments of the present invention will be described further with reference to the attached drawings. Each of said embodiments provides an ultra wide angle lens of an image angle of 100° or larger, with a rear focal length larger the focal distance.

In the numerical table of each embodiment, $r_i$ indicates the radius of curvature of an i-th face (i=1, 2, 3, ... ) from the object side; $d_i$ indicates the axial distance between an i-th face and an (i+1)-th face; $n_{di}$ indicates the refractive index for d line of the medium between the i-th face and the (i+1)-th face; and $v_{di}$ indicates the Abbe's number of the medium between the i-th face and the (i+1)-th face (however Abbe's number for air being left as blank). The distance $d_i$ for the last face indicates the rear focal length, and the effective diameter of the lens of the first face is the maximum effective diameter of the entire lens system.

Also in the numerical table of each embodiment, the aspehrical face is represented by a polynomial:

$x=Cy^2/\{1+(1-_\kappa C^2y^2)^{1/2}\}+C_4y^4+C_6y^6+\ldots$ defining the axial distance x from the center of the aspherical face as a function of the distance y of the face from the optical axis, with the curvature C at said center of the curved face, aspherical constants $C_4, C_6, \ldots$ and a conical constant $\kappa$.

Figure 2A:
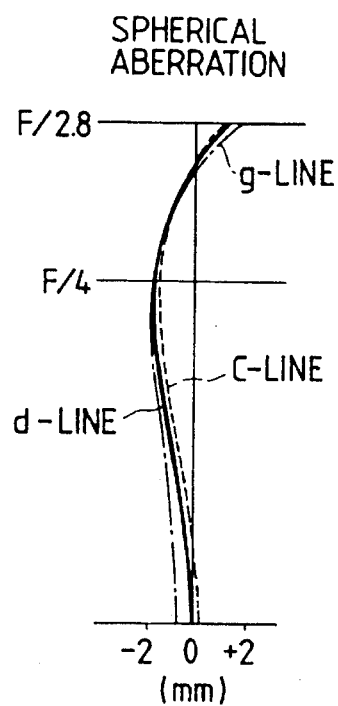
FIGS. 2A, 2B and 2C are aberration charts of said 1st embodiment.
Figure 2B:
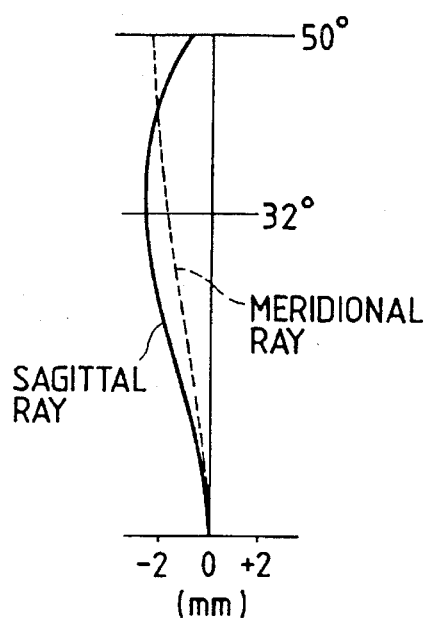
Figure 2C:
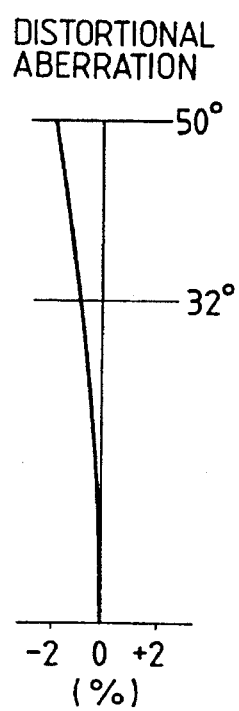

FIG. 1 is a view showing lens configuration of a 1st embodiment of the present invention, and FIGS. 2A, 2B and 2C are aberration charts of said 1st embodiment. As shown in FIG. 1, the 1st embodiment is composed, in the order from the object side, of a front lens group $G_F$ consisting of a first lens group $G_1$ of a negative power and a second lens group $G_2$ of a positive power, a diaphragm S, and a rear lens group $G_R$ consisting of a third lens group of a positive power. Said first lens group $G_1$ is composed solely of a negative meniscus lens $L_1$ convex to the object side. The second lens group $G_2$ is composed, in the order from the object side, of an adhered lens $L_2$, consisting of a negative meniscus lens $L_{21}$ convex to the object side and a positive meniscus lens $L_{22}$ convex likewise to the object side, and a biconvex positive lens $L_3$.

The third lens group $G_3$ is composed, in the order from the object side, of an adhered lens $L_4$ consisting of a positive meniscus lens $L_{41}$ convex to the image side and a negative meniscus lens $L_{42}$ likewise convex to the image side, an adhered lens $L_5$ consisting of a positive meniscus lens $L_{51}$ convex to the image side and a biconcave lens $L_{52}$, a positive meniscus lens $L_6$ convex to the image side, and a boconvex positive lens $L_7$ having a stronger curvature on the face of the image side. In this embodiment shown in FIG. 1 the radii of curvature $r_i$, distances $d_i$ of lens faces, refractive indexes $n_{di}$ and Abbe's numbers $v_{di}$ are selected as shown in Table 1.

TABLE 1

(1st embodiment)

| i | $r_i$ | $d_i$ | $n_{di}$ | $v_{di}$ |
|---|---|---|---|---|
| 1 | 736.951 | 5.490 | 1.77279 | 49.45 |
| *2 | 99.559 | 105.968 | 1.00000 | |
| 3 | 227.925 | 26.847 | 1.77279 | 45.45 |
| 4 | 86.498 | 106.517 | 1.60342 | 38.03 |
| 5 | 848.627 | 1.647 | 1.00000 | |
| 6 | 159.826 | 43.924 | 1.60342 | 38.03 |
| 7 | −6698.393 | 16.471 | 1.00000 | |
| 8 | −3216.170 | 19.766 | 1.57501 | 41.42 |
| 9 | −58.390 | 10.981 | 1.74810 | 52.30 |
| 10 | −210.440 | 11.530 | 1.00000 | |
| 11 | −283.318 | 28.002 | 1.80411 | 46.55 |
| 12 | −104.074 | 5.490 | 1.80518 | 25.35 |
| 13 | 333.225 | 7.686 | 1.00000 | |
| 14 | −226.181 | 14.824 | 1.62041 | 60.14 |
| 15 | −93.959 | 1.098 | 1.00000 | |
| 16 | 458.139 | 19.217 | 1.62041 | 60.14 |
| 17 | −219.467 | 205.941 | 1.00000 | |

$|h_p/r_A| = 0.900$

In Table 1, the asterisked face 2 is an aspherical face, of which radius $r_2$ of curvature indicates that on the optical axis. The form of said aspherical second face is defined in the aforementioned polynomial by $C=1/r_2$, $C_4=C_6= \ldots =0$ and $\kappa=0$ (parabolic face).

The entire lens system of the 1st embodiment shown in FIG. 1 has a focal distance f of 100 mm, a rear focal length Bf of 205.9 mm, an F number $F_{NO}$ of 2.8 and an image angle $2\theta$ of 100° (half image angle $\theta=50°$). Also the effective diameter $\phi$ of the negative lens $L_1$ closest to the object side, defined on the tangential plane to the peak point of the face at the object side of said negative lens $L_1$, by an aperture requiring a peripheral light amount of 110% to the axial light amount, is 275 mm. Thus, since $4 \cdot f \cdot \tan\theta$ is 476 mm, the condition $\phi < 4 \cdot f \cdot \tan\theta$ is easily satisfied. It is to be noted that $f_1=−150$ mm= $−1.5f$.

Figure 3:
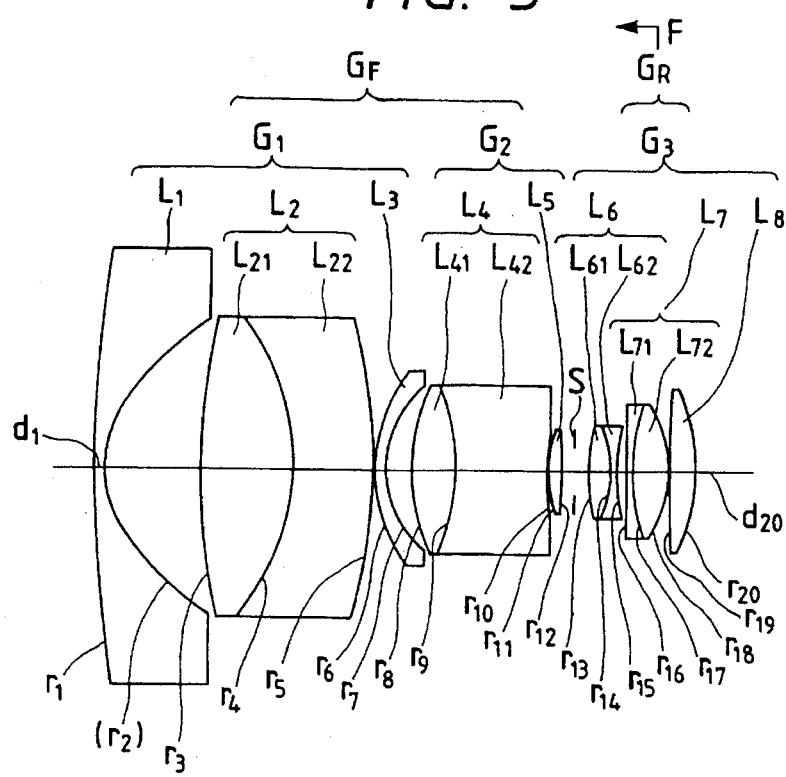
FIG. 3 is a view showing lens configuration of a 2nd embodiment of the present invention.
Figure 4A:
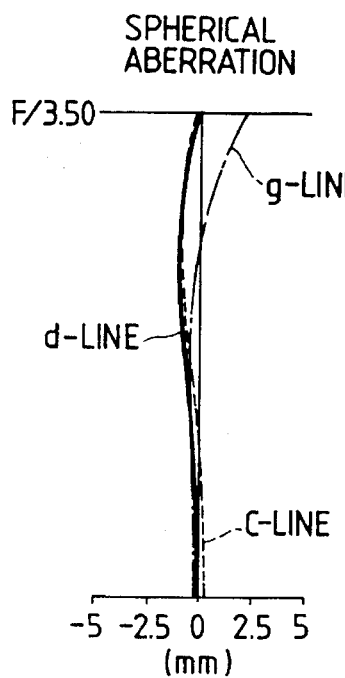
FIGS. 4A, 4B and 4C are aberration charts of said 2nd embodiment.
Figure 4B:
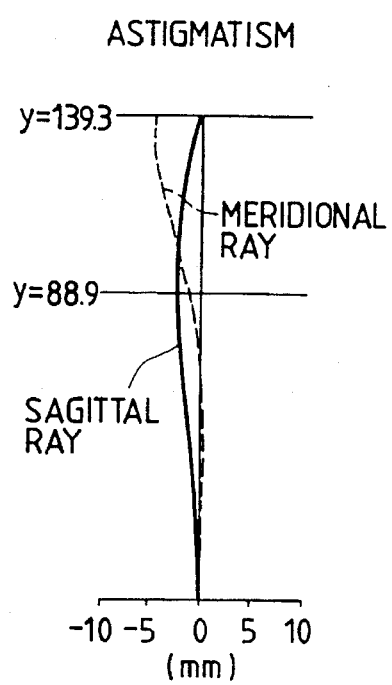
Figure 4C:
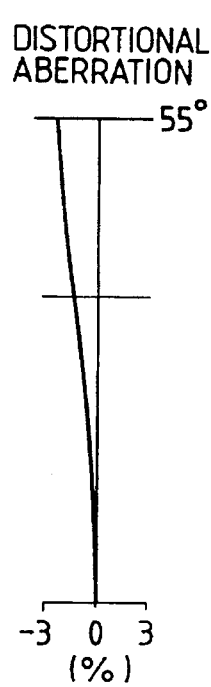

FIG. 3 is a view showing lens configuration of a 2nd embodiment of the present invention, and FIGS. 4A, 4B and 4C are aberration charts of said 2nd embodiment. As shown in FIG. 3, the 2nd embodiment is composed, in the order from the object side, of a first lens group $G_1$ of a negative power, a second lens group $G_2$ of a positive power, a diaphragm S, and a third lens group $G_3$ of a positive power. The first lens group $G_1$ is composed of a negative meniscus lens $L_1$ convex to the object side, an adhered lens $L_2$ consisting of a biconvex lens $L_{21}$ and a negative meniscus lens $L_{22}$ convex to the image side, and a negative meniscus lens $L_3$ convex to the object side. The second lens group $G_2$ is composed, in the order from the object side, of an adhered lens $L_4$ consisting of a biconvex lens $L_{41}$ and a biconcave lens $L_{42}$, and a biconvex lens $L_5$.

The third lens group $G_3$ is composed, in the order from the object side, of an adhered lens $L_6$ consisting of a biconvex positive lens $L_{61}$ and a biconcave negative lens $L_{62}$, an adhered lens $L_7$ consisting of a biconcave negative lens $L_{71}$ and a biconvex positive lens $L_{72}$, and a biconvex positive lens $L_8$ having a stronger curvature in the face at the image side.

In this 2nd embodiment, the radii $r_i$ of curvature, distances $d_i$ of lens faces, refractive indexes $n_{di}$ and Abbe's numbers $v_{di}$ are selected as shown in Table 2.

TABLE 2

(2nd embodiment): f = 100, $F_{NO}$ = 3.5, $2\theta = 110°$

| i | $r_i$ | $d_i$ | $n_{di}$ | $v_{di}$ |
|---|---|---|---|---|
| 1 | 1141.843 | 9.868 | 1.77279 | 49.45 |
| *2 | 94.601 | 85.526 | 1.00000 | |
| 3 | 590.915 | 85.449 | 1.61293 | 36.98 |
| 4 | −210.851 | 71.236 | 1.71300 | 53.93 |
| 5 | −495.018 | 1.315 | 1.00000 | |
| 6 | 139.541 | 9.868 | 1.65160 | 58.50 |
| 7 | 97.296 | 23.026 | 1.00000 | |
| 8 | 176.250 | 39.473 | 1.62004 | 36.27 |
| 9 | −201.482 | 84.210 | 1.80411 | 46.55 |
| 10 | 208.521 | 1.315 | 1.00000 | |
| 11 | 131.381 | 13.157 | 1.58144 | 40.76 |
| 12 | −540.218 | 24.342 | 1.00000 | |
| 13 | 211.677 | 19.736 | 1.51680 | 64.10 |
| 14 | −96.540 | 6.578 | 1.79631 | 40.90 |
| 15 | 242.213 | 7.894 | 1.00000 | |
| 16 | −3841.914 | 4.605 | 1.79504 | 28.57 |
| 17 | 159.372 | 34.210 | 1.51680 | 64.10 |
| 18 | −110.558 | 1.315 | 1.00000 | |
| 19 | 1646.110 | 23.026 | 1.51680 | 64.10 |
| 20 | −172.890 | 250.995 | 1.00000 | |

$|h_p/r_A| = 1.194$

In Table 2, the asterisked face 2 is an aspherical face, of which radius $r_2$ of curvature indicates that on the optical axis. The form of said aspherical second face is defined in the aforementioned polynomial by $C=1/r_2$, $C_4=C_6= \ldots =0$ and $\kappa=0$.

The entire lens system of the 2nd embodiment shown in FIG. 3 has a focal distance f of 100 mm, a rear focal length Bf of 251.0 mm, an F number $F_{NO}$ of 3.5 and an image angle $2\theta$ of 110° (half image angle $\theta=55°$). Also the effective diameter $\phi$ of the negative lens $L_1$ closest to the object side for a peripheral light amount of 264% is 415 mm, so that the condition $\phi < 4 \cdot f \cdot \tan\theta$ is easily satisfied. It is to be noted that $f_1=−129.52$ mm=$−1.3f$.

FIG. 5 is a view showing lens configuration of a 3rd embodiment of the present invention, and FIGS. 6A, 6B and 6C are aberration charts of said 3rd embodiment.

As shown in FIG. 5, the 3rd embodiment is composed, in the order from the object side, of a first lens group $G_1$ of a negative power, a second lens group $G_2$ of a positive power, a diaphragm S and a third lens group $G_3$ of a positive power. Said first lens group $G_1$ is composed of a negative meniscus lens $L_1$ convex to the object side, an adhered lens $L_2$ consisting of a negative meniscus lens $L_{21}$ convex to the object side and a positive meniscus lens $L_{22}$ convex to the object side, and a negative meniscus lens $L_3$ convex to the object side. The second lens group $G_2$ is composed, in the order from the object side, of an adhered lens $L_4$ consisting of a negative meniscus lens $L_{41}$ convex to the object side and a positive meniscus lens $L_{42}$ convex to the object side, and a positive meniscus lens $L_5$ convex to the object side.

The third lens group $G_3$ is composed, in the order from the object side, of an adhered lens $L_6$ consisting of a biconvex positive lens $L_{61}$ and a biconcave negative lens $L_{62}$, an adhered lens $L_7$ consisting of a biconcave negative lens $L_{71}$ and a biconvex positive lens $L_{72}$, and a biconvex positive lens $L_8$ having a stronger curvature in the face at the image side.

In the 3rd embodiment, the radii $r_i$ of curvature, distances $d_i$ of lens faces, refractive indexes $n_{di}$ and Abbe's numbers $v_{di}$ are selected as shown in Table 3.

TABLE 3

(3rd embodiment): f = 100, $F_{NO}$ = 3.5
2θ = 110°

| i | $r_i$ | $d_i$ | $n_{di}$ | $v_{di}$ |
|---|---|---|---|---|
| 1 | 1333.575 | 9.868 | 1.74810 | 52.30 |
| *2 | 106.710 | 98.305 | 1.00000 | |
| 3 | 221.380 | 23.026 | 1.71300 | 53.93 |
| 4 | 138.762 | 106.382 | 1.59507 | 35.51 |
| 5 | 923.259 | 1.315 | 1.00000 | |
| 6 | 192.744 | 9.868 | 1.65160 | 58.50 |
| 7 | 109.801 | 32.894 | 1.00000 | |
| 8 | 187.842 | 16.447 | 1.74810 | 52.30 |
| 9 | 88.457 | 132.099 | 1.62004 | 36.27 |
| 10 | 356.513 | 1.315 | 1.00000 | |
| 11 | 139.600 | 13.157 | 1.51680 | 64.10 |
| 12 | 348.181 | 24.342 | 1.00000 | |
| 13 | 178.124 | 19.736 | 1.51680 | 64.10 |
| 14 | −108.565 | 6.578 | 1.79668 | 45.37 |
| 15 | 311.912 | 11.184 | 1.00000 | |
| 16 | −2911.027 | 4.605 | 1.80384 | 33.92 |
| 17 | 158.548 | 34.210 | 1.51680 | 64.10 |
| 18 | −112.805 | 1.315 | 1.00000 | |
| 19 | 342.313 | 29.605 | 1.51680 | 64.10 |
| 20 | −239.277 | 1258.613 | 1.00000 | |

$|h_p/r_A| = 1.348$

In Table 3, the asterisked face 2 is an aspherical face, of which radius $r_2$ of curvature indicates that on the optical axis. The form of said aspherical second face is defined in the aforementioned polynomial by $C=1/r_2$, $C_4=C_6= \ldots =0$ and $\kappa=0$.

The entire lens system of the 3rd embodiment shown in FIG. 5 has a focal distance f of 100 mm, a rear focal length Bf of 258.6 mm, an F number $F_{NO}$ of 3.5 and an image angle 2θ of 110° (half image angle θ=55°). Also the effective diameter φ of the negative lens $L_1$ closest to the object side for a peripheral light amount of 300% is 534 mm, so that the condition φ<4·f·tanθ is easily satisfied. It is to be noted that $f_1$=−120.24 mm=−1.2f.

Figure 7:
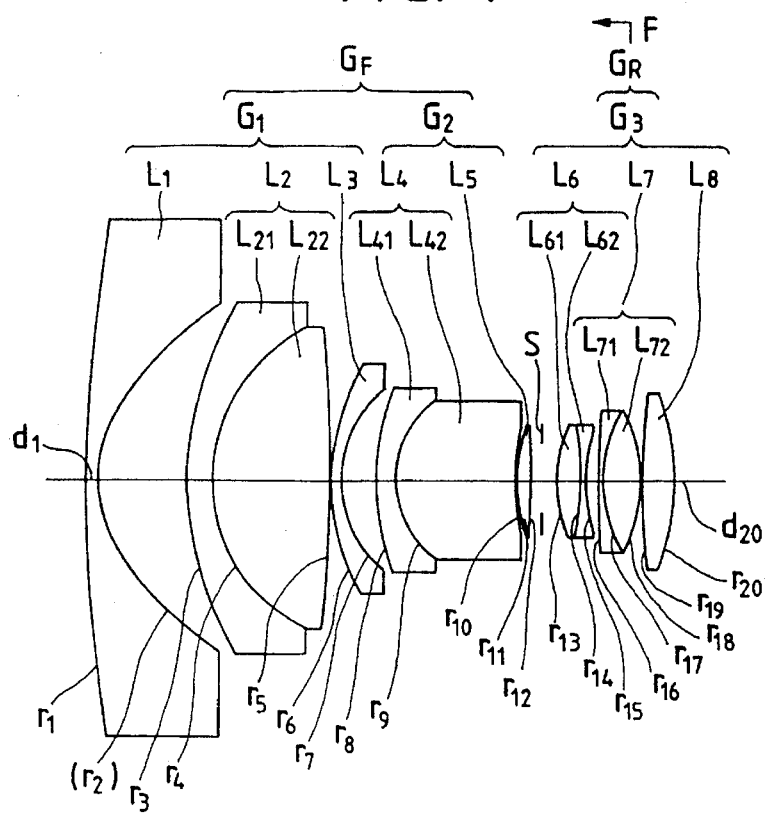
FIG. 7 is a view showing lens configuration of a 4th embodiment of the present invention.
Figure 8A:
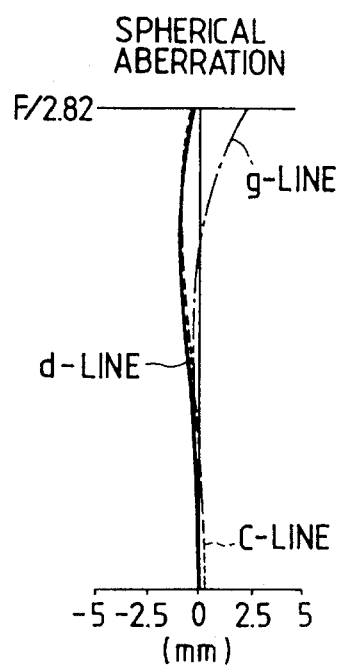
FIGS. 8A, 8B and 8C are aberration charts of said 4th embodiment.
Figure 8B:
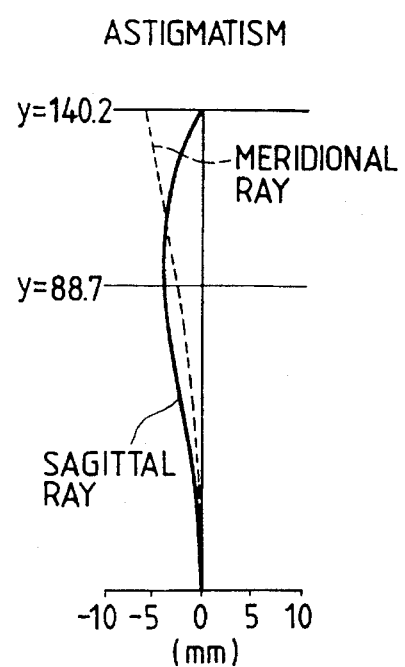
Figure 8C:
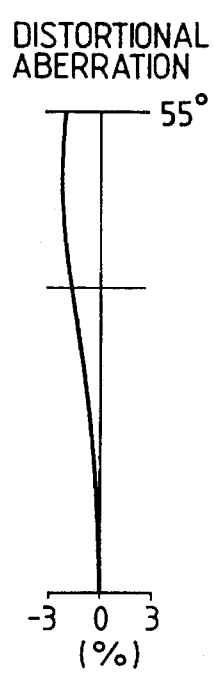

FIG. 7 is a view showing lens configuration of a 4th embodiment of the present invention, and FIGS. 8A, 8B and 8C are aberration charts of said 4th embodiment. As shown in FIG. 7, the 4th embodiment is composed, in the order from the object side, of a first lens group $G_1$ of a negative power, a second lens group $G_2$ of a positive power, a diaphragm S, and a third lens group $G_3$ of a positive power. Said first lens group $G_1$ is composed of a negative meniscus lens $L_1$ convex to the object side, an adhered lens $L_2$ consisting of a negative meniscus lens $L_{21}$ convex to the object side and a biconvex positive lens $L_{22}$, and a negative meniscus lens $L_3$ convex to the object side. The second lens group $G_2$ is composed, in the order from the object side, of an adhered lens $L_4$ consisting of a negative meniscus lens $L_{41}$ convex to the object side and a positive meniscus lens $L_{42}$ convex to the object side, and a biconvex positive lens $L_5$.

The third lens group $G_3$ is composed, in the order from the object side, of an adhered lens $L_6$ consisting of a biconvex positive lens $L_{61}$ and a biconcave negative lens $L_{62}$, an adhered lens $L_7$ consisting of a negative meniscus lens $L_{71}$ convex to the object side and a biconvex positive lens $L_{72}$, and a biconvex positive lens $L_8$ having a stronger curvature in the face at the image side.

In this 4th embodiment, the radii $r_i$ of curvature, distances $d_i$ of lens faces, refractive indexes $n_{di}$ and Abbe's number $v_{di}$ are selected as shown in Table 4.

TABLE 4

(4th embodiment): f = 100, $F_{NO}$ = 2.8,
2θ = 110°

| i | $r_i$ | $d_i$ | $n_{di}$ | $v_{di}$ |
|---|---|---|---|---|
| 1 | 1319.491 | 9.868 | 1.74810 | 52.30 |
| *2 | 108.017 | 82.236 | 1.00000 | |
| 3 | 288.869 | 23.026 | 1.71300 | 53.93 |
| 4 | 147.353 | 108.552 | 1.59507 | 35.51 |
| 5 | −1375.554 | 1.315 | 1.00000 | |
| 6 | 187.777 | 9.868 | 1.65160 | 58.50 |
| 7 | 99.315 | 32.894 | 1.00000 | |
| 8 | 212.517 | 16.447 | 1.74810 | 52.30 |
| 9 | 83.032 | 114.728 | 1.62004 | 36.27 |
| 10 | 217.920 | 1.315 | 1.00000 | |
| 11 | 146.295 | 13.157 | 1.51680 | 64.10 |
| 12 | −986.512 | 24.342 | 1.00000 | |
| 13 | 120.646 | 19.736 | 1.51680 | 64.10 |
| 14 | −411.297 | 6.578 | 1.79668 | 45.37 |
| 15 | 150.107 | 11.184 | 1.00000 | |
| 16 | 800.896 | 4.605 | 1.80384 | 33.92 |
| 17 | 127.565 | 34.210 | 1.51680 | 64.10 |
| 18 | −136.158 | 1.315 | 1.00000 | |
| 19 | 589.798 | 29.605 | 1.51680 | 64.10 |
| 20 | −220.870 | 248.442 | 1.00000 | |

$|h_p/r_A| = 1.211$

In Table 4, the asterisked face 2 is an aspherical face, of which radius $r_2$ of curvature indicates that on the optical axis. The form of said aspherical second face is defined in the aforementioned polynomial by $C=1/r_2$, $C_4=C_6= \ldots =0$ and $\kappa=0$.

The entire lens system of the 4th embodiment shown in FIG. 7 has a focal distance f of 100 mm, a rear focal length of 248.4 mm, an F number $F_{NO}$ of 2.8 and an image angle 2θ of 110° (half image angle θ=55°). Also the effective diameter φ of the negative lens $L_1$ closest to the object side is 492 mm, so that the condition φ=4· f·tanθ is easily satisfied. It is to be noted that $f_1$=−117.12 mm=−1.17f.

Figure 9:
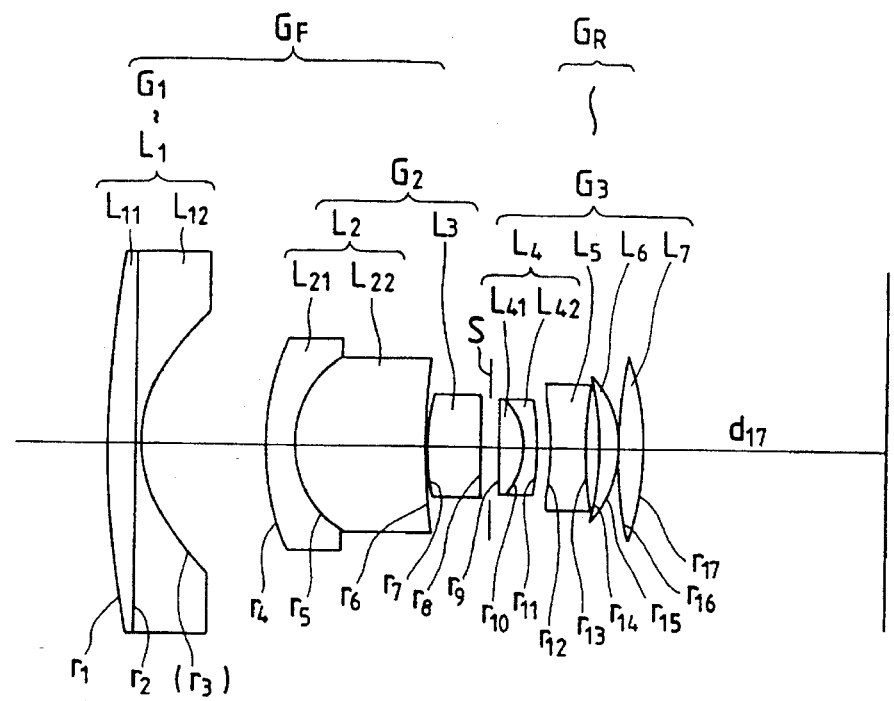
FIG. 9 is a view showing lens configuration of a 5th embodiment of the present invention.
Figure 10A:
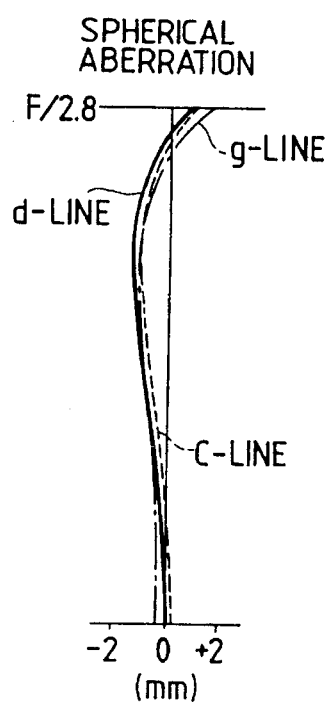
FIGS. 10A, 10B and 10C are aberration charts of said 5th embodiment.
Figure 10B:
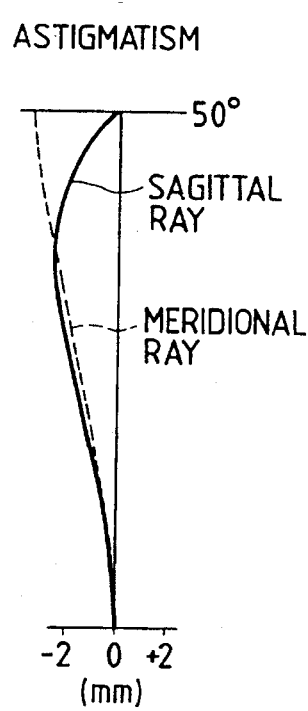
Figure 10C:
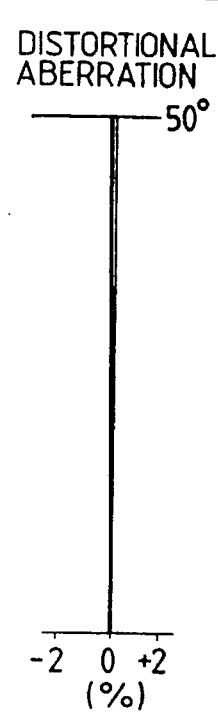

FIG. 9 is a view showing lens configuration of a 5th embodiment of the present invention, and FIGS. 10A, 10B and 10C are aberration charts of said 5th embodiment. As shown in FIG. 9, the 5th embodiment is composed, in the order from the object side, of a first lens group $G_1$ of a negative power, a second lens group $G_2$ of a positive power, a diaphragm S and a third lens group $G_3$ of a positive power. Said first lens group $G_1$ is composed of an adhered lens $L_1$ consisting, for correcting color aberration, of a positive lens $L_{11}$ having a convex face at the object side and a flat face at the image side and a negative lens $L_{12}$ having an aspherical fact at the image side. The second lens group $G_2$ is composed, in the order from the object side, of an adhered lens $L_2$ consisting of a negative meniscus lens $L_{21}$ convex to the object side and a positive meniscus lens $L_{22}$ convex likewise to the object side, and a biconvex positive lens $L_3$.

The third lens group $G_3$ is composed, in the order from the object side, of an adhered lens $L_4$ consisting of a positive meniscus lens $L_{41}$ convex to the image side and a negative meniscus lens $L_{42}$ convex likewise to the image side, a biconcave negative lens $L_5$, a positive meniscus lens $L_6$ convex to the image side, and a biconvex positive lens $L_7$ having a stronger curvature in the face at the image side. In the 5th embodiment shown in FIG. 9, the radii $r_i$ of curvature, distances $d_i$ of lens faces, refractive indexes $n_{di}$ and Abbe's numbers $v_{di}$ are selected as shown in Table 5.

TABLE 5

(5th embodiment: f = 100, $F_{NO}$ = 2.8, 2θ = 100°)

| i | $r_i$ | $d_i$ | $n_{di}$ | $v_{di}$ |
|---|---|---|---|---|
| 1 | 765.025 | 21.857 | 1.78470 | 26.05 |
| 2 | ∞ | 5.464 | 1.77279 | 49.45 |
| *3 | 97.480 | 105.464 | 1.00000 | |
| 4 | 191.485 | 24.590 | 1.77279 | 49.45 |
| 5 | 81.967 | 107.650 | 1.60342 | 38.02 |
| 6 | 497.718 | 1.639 | 1.00000 | |
| 7 | 157.923 | 43.715 | 1.62374 | 47.10 |
| 8 | −8253.032 | 16.393 | 1.00000 | |
| 9 | −790.556 | 19.672 | 1.58913 | 61.09 |
| 10 | −55.464 | 10.928 | 1.74443 | 49.52 |
| 11 | −183.059 | 11.475 | 1.00000 | |
| 12 | −250.013 | 29.508 | 1.80518 | 25.35 |
| 13 | 353.551 | 10.928 | 1.00000 | |
| 14 | −245.901 | 14.754 | 1.62041 | 60.14 |
| 15 | −98.360 | 1.092 | 1.00000 | |
| 16 | 398.906 | 20.764 | 1.62041 | 60.14 |
| 17 | −216.742 | 201.662 | 1.00000 | |

$|h_p/r_A| = 0.927$

In Table 5, the asterisked face 3 is aspherical face, of which radius $r_3$ of curvature indicates that on the optical axis. The form of said aspherical third face is defined in the aforementioned polynomial by $C=1/r_3$, $C_4=C_6= \ldots =0$ and κ=0 (Parabolic face).

The entire lens system of the 5th embodiment shown in FIG. 9 has a focal distance of 100 mm, a rear focal length of 201.7 mm, an F number $F_{NO}$ of 2.8 and an image angle 2θ of 100° (half image angle θ=50°). Also the effective diameter φ of the negative lens $L_1$ closest to the object side for a peripheral light amount of 110% is 275 mm, so that the condition φ<4·f·tanθ is easily satisfied. It is to be noted that $f_1$=−148 mm=−1.48f.

Figure 11:
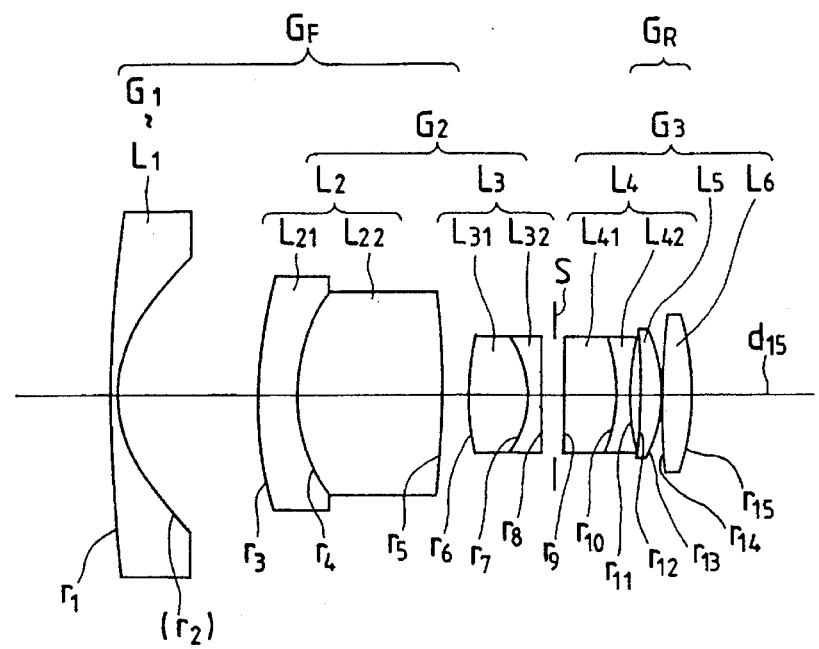
FIG. 11 is a view showing lens configuration of a 6th embodiment of the present invention.
Figure 12A:
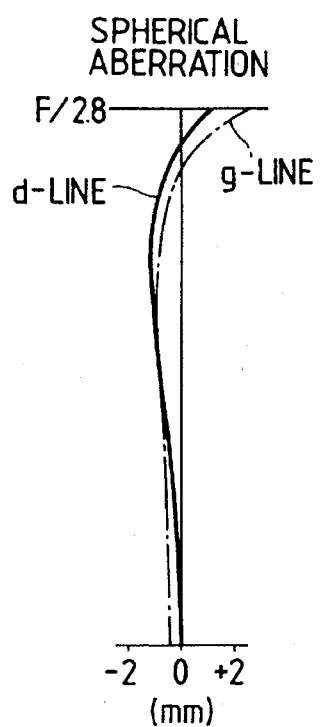
FIGS. 12A, 12B and 12C are aberration charts of said 6th embodiment.
Figure 12B:
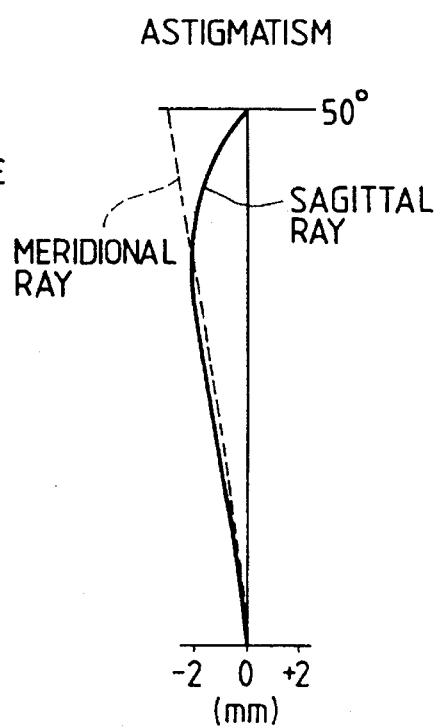
Figure 12C:
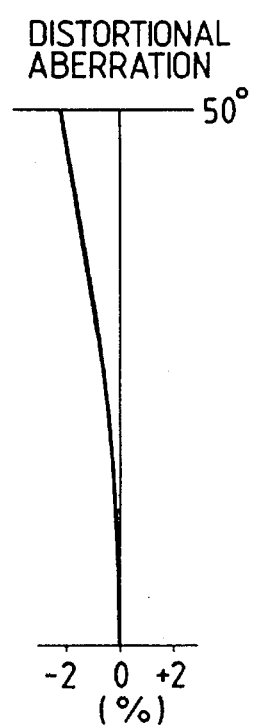

FIG. 11 is a view showing lens configuration of a 6th embodiment of the present invention, and FIGS. 12A, 12B and 12C are aberration charts of said 6th embodiment. As shown in FIG. 11, the 6th embodiment is composed, in the order from the object side, of a first lens group $G_1$ of a negative power, a second lens group $G_2$ of a positive power, a diaphragm S and a third lens group $G_3$ of a positive power. Said first lens group $G_1$ is composed solely of a negative meniscus lens $L_1$ convex to the object side. The second lens group $G_2$ is composed, in the order from the object side, of an adhered lens $L_2$ consisting of a negative meniscus lens $L_{21}$ convex to the object side and a biconvex positive lens $L_{22}$, and an adhered lens $L_3$ consisting of a biconvex positive lens $L_{31}$ and a negative meniscus lens $L_{32}$.

The third lens group $G_3$ is composed, in the order from the object side, of an adhered lens $L_4$ consisting of a positive meniscus lens $L_{41}$ convex to the image side and a biconcave negative lens $L_{42}$, a positive meniscus lens $L_5$ convex to the image side, and a biconvex positive lens $L_6$ having a stronger curvature in the face at the image side. In the 6th embodiment shown in FIG. 11 the radii $r_i$ of curvature distances $d_i$ of lens faces, refractive indexes $n_{di}$ and Abbe's numbers $v_{di}$ are selected as shown in Table 6.

TABLE 6

(6th embodiment) f = 100, $F_{NO}$ = 2.8, 2θ = 100°

| i | $r_i$ | $d_i$ | $n_{di}$ | $v_{di}$ |
|---|---|---|---|---|
| 1 | 979.796 | 5.413 | 1.77279 | 49.45 |

TABLE 6-continued (6th embodiment) f = 100, $F_{NO}$ = 2.8, 2θ = 100°

| i | $r_i$ | $d_i$ | $n_{di}$ | $v_{di}$ |
|---|---|---|---|---|
| *2 | 94.079 | 99.066 | 1.00000 | |
| 3 | 276.586 | 29.774 | 1.77279 | 49.45 |
| 4 | 126.733 | 104.566 | 1.62004 | 36.27 |
| 5 | −525.890 | 18.135 | 1.00000 | |
| 6 | 169.788 | 43.307 | 1.57501 | 41.42 |
| 7 | −71.525 | 10.826 | 1.74810 | 52.30 |
| 8 | −3830.195 | 16.240 | 1.00000 | |
| 9 | −16113.440 | 37.352 | 1.77279 | 49.45 |
| 10 | −104.122 | 10.826 | 1.86518 | 25.35 |
| 11 | 234.356 | 7.037 | 1.00000 | |
| 12 | −303.505 | 14.616 | 1.62041 | 60.14 |
| 13 | −98.727 | 1.082 | 1.00000 | |
| 14 | 751.268 | 18.947 | 1.62041 | 60.14 |
| 15 | −212.510 | 206.762 | 1.00000 | |

$|h_p/r_A| = 0.913$

In Table 6, the asterisked face 2 is an aspherical face, of which radius $r_2$ of curvature indicates that on the optical axis. The form of said aspherical face is defined in the aforementioned polynomial, with $C=1/r_2$, $C_4=C_6= \ldots =0$ and κ=0 (parabolic face).

The entire lens system of the 6th embodiment shown in FIG. 11 has a focal distance f of 100 mm, a rear focal length of 206.7 mm, an F number $F_{NO}$ of 2.8 and an image angle of 100° (half image angle θ=50°). Also the effective diameter of the negative lens $L_1$ closest to the object side, for a peripheral light amount of 110%, is 275 mm, so that 4·f·tanθ is 476 mm and the condition φ<4·f·tanθ is easily satisfied. It is to be noted that $f_1$=−149 mm=−1.49f.

In the above-explained 6th embodiment, the first lens group $G_1$ is composed solely of a negative lens $L_1$, but a lens for color aberration correction may be adhered thereto as in the 5th embodiment. Such configuration will facilitate the correction of color aberration in the second lens group $G_2$ and the third lens group $G_3$.

Figure 13:
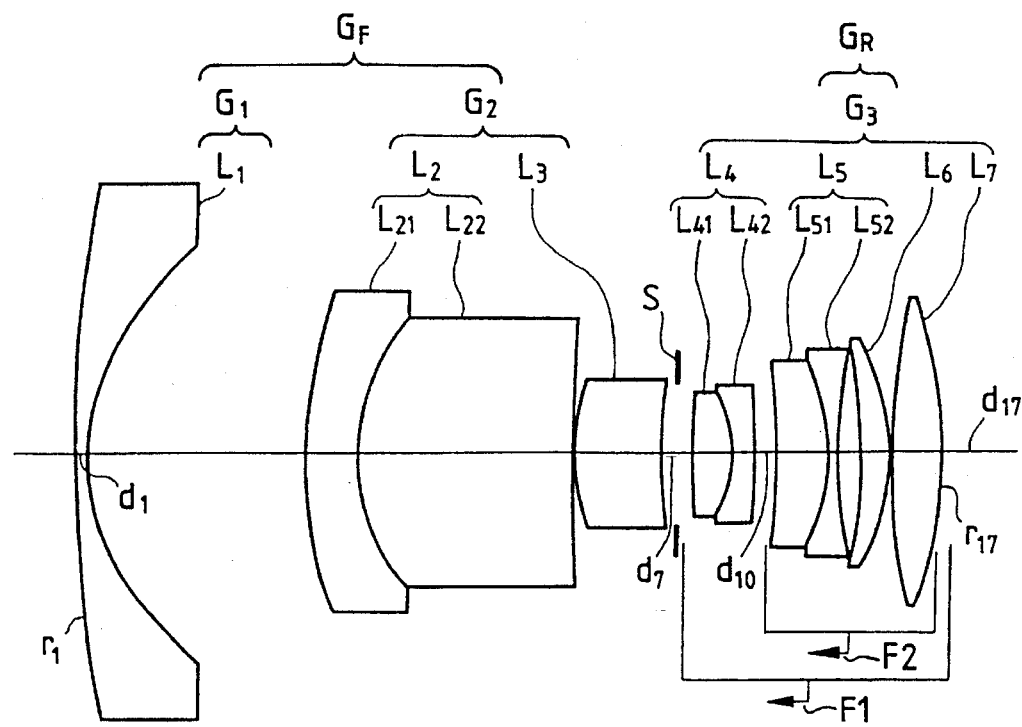
FIG. 13 is a view showing lens configuration of a 7th embodiment of the present invention.

FIG. 13 is a view showing lens configuration of a 7th embodiment of the present invention in a state focused to infinite distance, and FIGS. 14A to 16C are aberration charts of said 7th embodiment.

As shown in FIG. 13, the 7th embodiment is composed, in the order from the object side, of a front lens group $G_F$ of a negative refractive power, a diaphragm S and a rear lens group $G_R$ of a positive refractive power. Said front lens group $G_F$ is composed, in the order from the object side, of a first lens group $G_1$ consisting of a negative meniscus lens $L_1$ convex to the object side; and a second lens group $G_2$ consisting of an adhered lens $L_2$, consisting of a negative meniscus lens $L_{21}$ convex to the object side and a positive meniscus lens $L_{22}$ convex likewise to the object side, and a positive meniscus lens $L_3$ convex to the object side.

The rear lens group $G_R$ is composed, in the order from the object side, of an adhered lens $L_4$ consisting of a biconvex positive lens $L_{41}$ and a negative meniscus lens $L_{42}$ convex to the image side, an adhered lens $L_5$ consisting of a positive meniscus lens $L_{51}$ convex to the image side and a biconcave negative lens $L_{52}$ having a concave face of a stronger curvature at the object side, a positive meniscus lens $L_6$ convex to the image side, and a biconvex positive lens $L_7$ having the face of a stronger curvature at the image side. In this 7th embodiment shown in FIG. 13, the radii $r_i$ of curvature, distances $d_i$ of lens faces refractive indexes $n_{di}$ and Abbe's numbers $v_{di}$ are selected as shown in Table 7.

It is to be noted that this 7th embodiment is identical with the 1st embodiment shown in FIG. 1, except for the forms of the positive lenses $L_3$ and $L_{41}$ positioned across the diaphragm S.

TABLE 7

(7th embodiment): f = 100, $F_{NO}$ = 2.8, 2θ = 100°

| i | $r_i$ | $d_i$ | $n_{di}$ | $v_{di}$ |
|---|---|---|---|---|
| 1 | 733.445 | 5.464 | 1.77279 | 49.45 |
| *2 | 96.873 | 109.289 | 1.00000 | |
| 3 | 226.711 | 26.719 | 1.77279 | 49.45 |
| 4 | 96.883 | 109.289 | 1.59507 | 35.51 |
| 5 | 1255.857 | 1.639 | 1.00000 | |
| 6 | 123.439 | 43.715 | 1.60342 | 38.03 |
| 7 | 245.521 | Δ16.393 | 1.00000 | |
| 8 | 330.203 | 19.672 | 1.57501 | 41.42 |
| 9 | −61.987 | 10.928 | 1.74810 | 52.30 |
| 10 | −477.301 | Δ10.928 | 1.00000 | |
| 11 | −462.429 | 26.229 | 1.80411 | 46.55 |
| 12 | −99.306 | 5.464 | 1.80518 | 25.35 |
| 13 | 275.371 | 10.928 | 1.00000 | |
| 14 | −249.244 | 14.754 | 1.62041 | 60.14 |
| 15 | −104.473 | 1.092 | 1.00000 | |
| 16 | 327.801 | 19.130 | 1.62041 | 60.14 |
| 17 | −210.719 | 206.010 (variable) | 1.00000 | |

In Table 7, the asterisked face 2 is an aspherical face, and the radius $r_2$ of curvature indicates that on the optical axis. The form of said aspherical face is defined in the aforementioned polynomial (A), with $C=1/r_2$, $C_4=C_6= \ldots =0$ and $\kappa=0$ (parabolic face).

The entire lens system of the 7th embodiment shown in FIG. 7 has a focal distance f of 100 mm, a rear focal length of 206.0 mm when focused to infinite distance, a total length of 637.6 mm from the first face to the image plane, an F number $F_{NO}$ of 2.8 and an image angle 2θ of 100° (half image angle θ=50°). Also the effective diameter of the negative lens $L_1$ closest to the object side is 275 mm, when defined on a tangential plane to the peak point of a face at the object side of said negative lens $L_1$, by a diameter requiring a peripheral light amount of 110% of the light amount on the optical axis. Thus 4·f·tanθ in the condition (2) is 476 mm, so that said condition $\phi<4\cdot f\cdot\tan\theta$ is easily satisfied.

For the focal length $f_1$ of the negative lens $L_1$ in the front lens group $G_F$, $f_1=-150$ mm$=-1.5f$.

In this 7th embodiment, focusing to an object at a short distance can be achieved, as shown in FIG. 13, by advancing the entire rear lens group $G_R$ toward the diaphragm S as indicated by an arrow $F_1$, reducing the gap $d_7$ between the front and rear lens groups, including the diaphragm S. In this case the rear focal length $d_{17}$ becomes longer, corresponding to said advancement. The focusing may also be achieved by advancing a lens group consisting of the adhered lens $L_5$, positive meniscus lens $L_6$ and biconvex positive lens $L_7$ in the rear lens group $G_R$, toward the diaphragm S as indicated by an arrow $F_2$, reducing the gap $d_{10}$ between the lenses $L_4$ and $L_5$. Also in this case the rear focal length $d_{17}$ becomes longer, corresponding to said advancement.

Figure 14A:
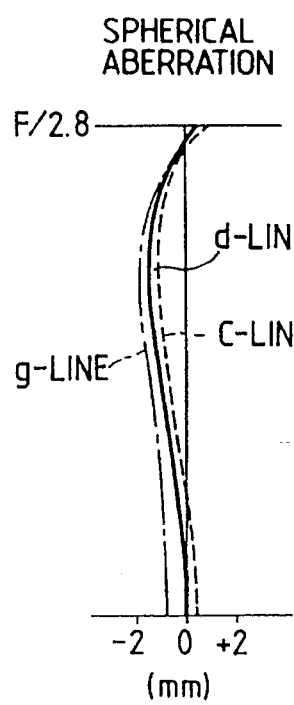
FIGS. 14A, 14B and 14C are aberration charts of said 7th embodiment when focused to infinity.
Figure 14B:
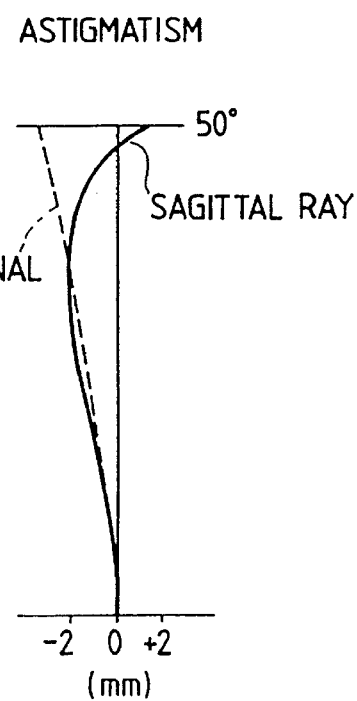
Figure 14C:
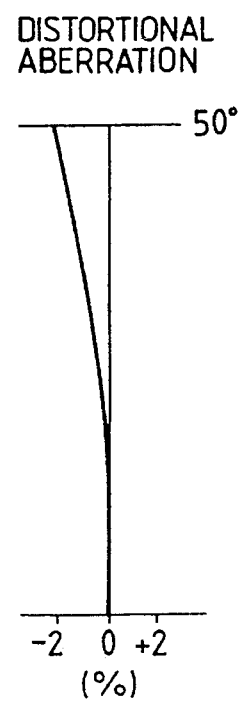
Figure 15A:
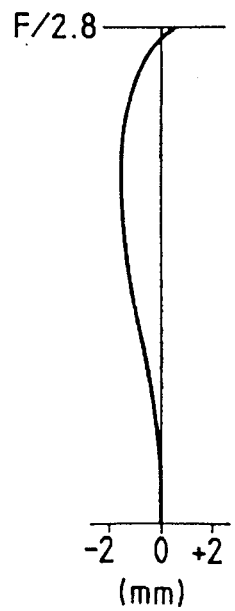
FIGS. 15A, 15B and 15C are aberration charts of said 7th embodiment when focused to a short distance by the movement of an entire rear lens group $G_F$.
Figure 15B:
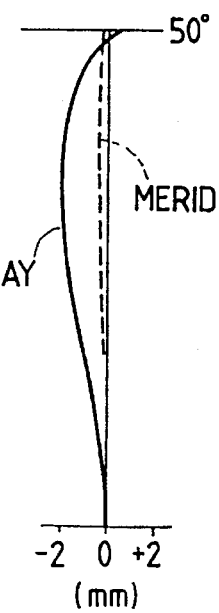
Figure 15C:
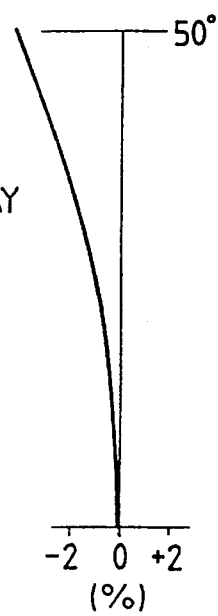
Figure 16A:
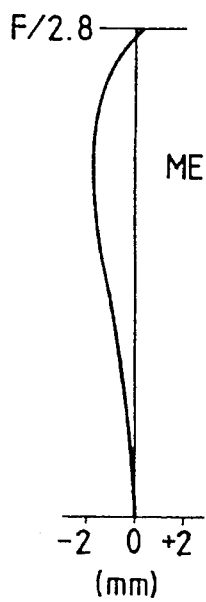
FIGS. 16A, 16B and 16C are aberration charts of said 7th embodiment when focused to a short distance by the movement of a part of the rear lens group $G_F$.
Figure 16B:
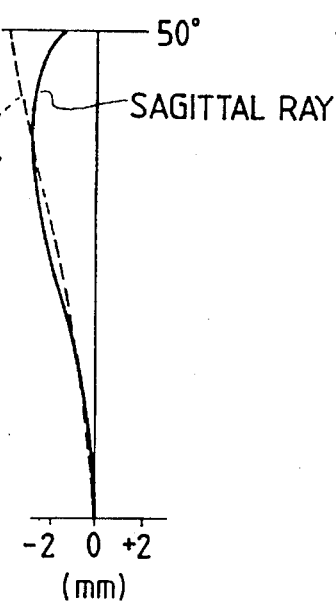
Figure 16C:
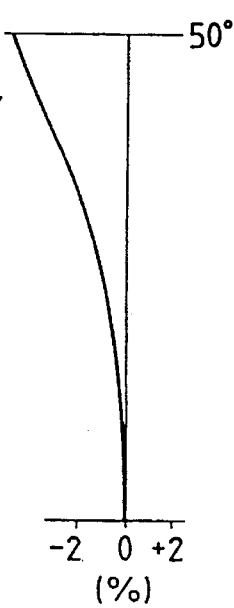

FIGS. 14A to 14C are aberration charts when the lens of the 7th embodiment is focused to infinity; FIGS. 15A to 15C are aberration charts when said lens is focused to an object of a short distance by reducing the gap $d_7$ to 8.88 mm; and FIGS. 16A to 16C are aberration charts when said lens is focused to an object of a short distance by reducing the gap $d_{10}$ to 3.40 min. These aberration charts indicate that the focusing to a short distance can be achieved with satisfactory aberration characteristics, by advancement of the rear lens group $G_R$ of a part thereof.

Figure 17:
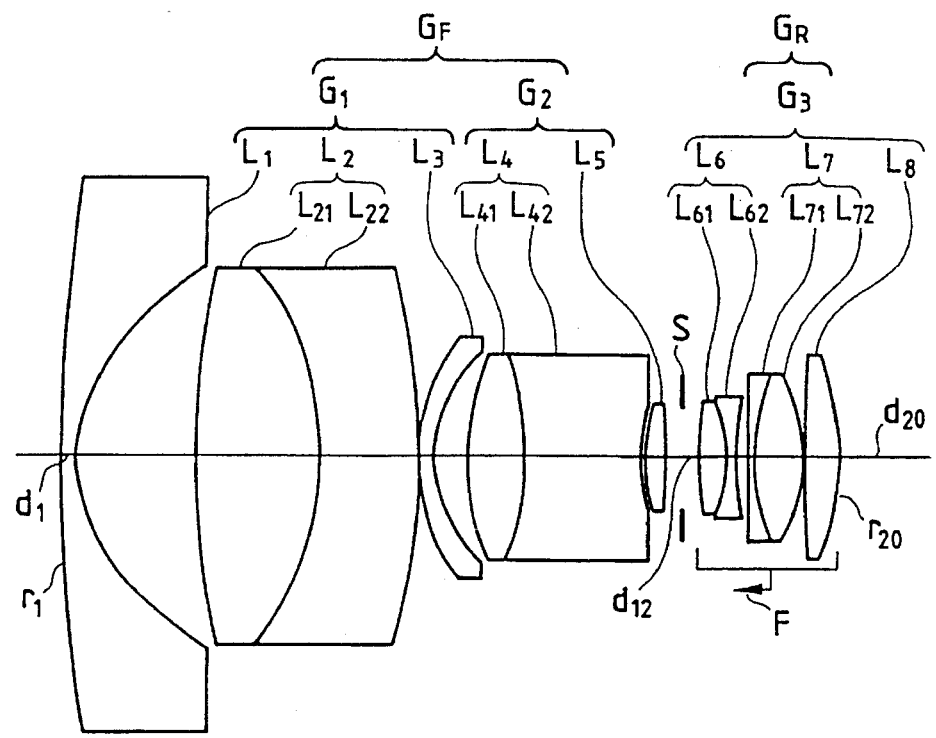
FIG. 17 is a view showing lens configuration of an 8th embodiment of the present invention.

FIG. 17 is a view showing lens configuration of an 8th embodiment of the present invention in a state focused to infinity, and FIGS. 18A to 19C are aberration charts of said 8th embodiment. As shown in FIG. 17, the 8th embodiment is composed, in the order from the object side, of a front lens group $G_F$ of a positive refractive power, a diaphragm S, and a rear lens group $G_R$ of a positive refractive power. Said front lens group $G_F$ is composed of a first lens group $G_1$, consisting of a negative meniscus lens $L_1$ convex to the object side, an adhered lens $L_2$ consisting of a biconvex lens $L_{21}$ and a negative meniscus lens $L_{22}$ convex to the image side, and a negative meniscus lens $L_3$ convex to the object side; and a second lens group $G_2$, consisting of an adhered lens $L_4$ consisting of a biconvex lens $L_{41}$ and a biconcave lens $L_{42}$, and a biconvex lens $L_5$.

The rear lens group $G_R$ consists of a third lens group $G_3$, composed, in the order from the object side, of an adhered lens $L_6$ consisting of a biconvex positive lens $L_{61}$ and a biconcave negative lens $L_{62}$, an adhered lens $L_7$ consisting of a biconcave negative lens $L_{71}$ and a biconvex positive lens $L_{72}$, and a biconvex positive lens $L_8$ having a face of a stronger curvature at the image side.

In the 8th embodiment shown in FIG. 17, the radii $r_i$ of curvature, distances $d_i$ of lens faces, refractive indexes $n_{di}$ and Abbe's numbers $v_{di}$ are selected same as those in the 2nd embodiment, as shown in Table 8.

TABLE 8

(8th embodiment: f = 100, $F_{NO}$ 3.5, 2θ = 110°)

| i | $r_i$ | $d_i$ | $n_{di}$ | $v_{di}$ |
|---|---|---|---|---|
| 1 | 1141.843 | 9.868 | 1.77279 | 49.45 |
| *2 | 94.601 | 85.526 | 1.00000 | |
| 3 | 590.915 | 85.449 | 1.61293 | 36.98 |
| 4 | −210.851 | 71.236 | 1.71300 | 59.93 |
| 5 | −495.018 | 1.315 | 1.00000 | |
| 6 | 139.541 | 9.868 | 1.65160 | 58.50 |
| 7 | 97.296 | 23.026 | 1.00000 | |
| 8 | 176.250 | 39.473 | 1.62004 | 36.27 |
| 9 | −201.482 | 84.210 | 1.80411 | 46.55 |
| 10 | 208.521 | 1.315 | 1.00000 | |
| 11 | 131.381 | 13.157 | 1.58144 | 40.76 |
| 12 | −540.218 | 24.342 (variable) | 1.00000 | |
| 13 | 211.677 | 19.736 | 1.51680 | 64.10 |
| 14 | −96.540 | 6.578 | 1.79631 | 40.90 |
| 15 | 242.213 | 7.894 | 1.00000 | |
| 16 | −3841.914 | 4.605 | 1.79504 | 28.57 |
| 17 | 159.372 | 34.210 | 1.51680 | 64.10 |
| 18 | −110.558 | 1.315 | 1.00000 | |
| 19 | 1646.110 | 23.026 | 1.51680 | 64.10 |
| 20 | −172.890 | 250.995 (variable) | 1.00000 | |

In Table 8, the asterisked face 2 is an aspherical face, and the radius $r_2$ of curvature on the optical axis. The form of said aspherical face is defined by the aforementioned polynomial (A), with $C=1/r_2$, $C_4=C_6= \ldots =0$ and $\kappa=0$.

The entire lens system of the 8th embodiment has a focal distance f of 100 mm, a rear focal length of 251.0 mm when focused to infinity, a total length of 797.2 mm, an F number $F_{NO}$ of 3.5 and an image angle 2θ of 110° (half image angle θ=55°). Also the effective diameter $\phi$ of the negative lens $L_1$ closest to the object side is 415 mm for a peripheral light amount of 264%, so that 4·f·tanθ is 571 mm. Thus the condition $\phi<4\cdot f\cdot\tan\theta$ is easily satisfied.

For the focal distance $f_1$ of the first lens group $G_1$ consisting of the negative lens $L_1$, adhered lens $L_2$ and negative meniscus lens $L_3$ in the front lens group $G_F$, there stands $f_1=-129.5$ mm$=-1.3f$.

In this 8th embodiment, the focusing to an object at a short distance can be achieved by advancing the entire rear lens group $G_R$ toward the diaphragm S, as indicated by an arrow F, reducing the gap $d_{12}$ between the front and rear lens groups, including the diaphragm S. In this case the rear focal length $d_{20}$ is extended, corresponding to said advancement.

Figure 18A:
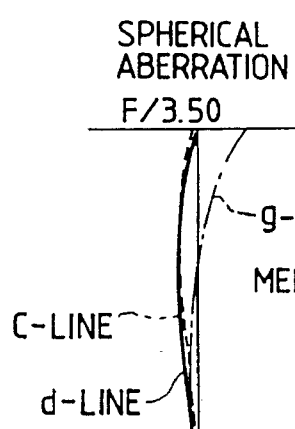
FIGS. 18A, 18B and 18C are aberration charts of said 8th embodiment when focused to infinity.
Figure 18B:
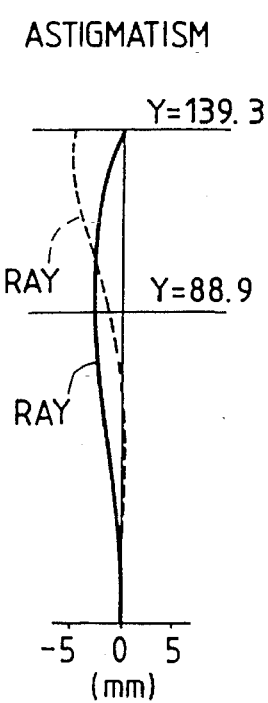
Figure 18C:
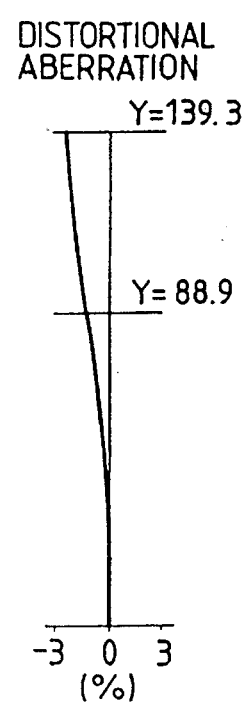
Figure 19A:
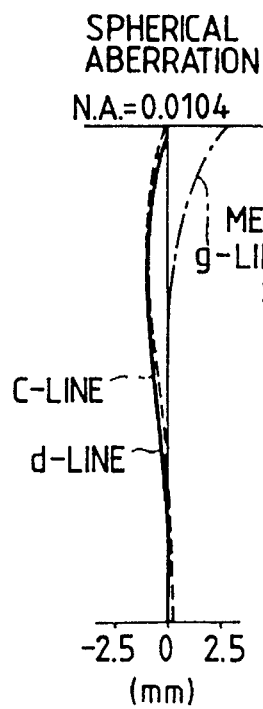
FIGS. 19A, 19B and 19C are aberration charts of said 8th embodiment when focused to a short distance.
Figure 19B:
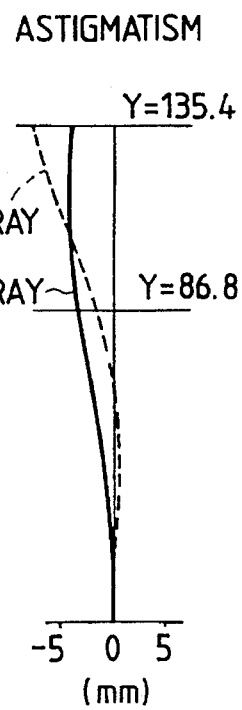
Figure 19C:
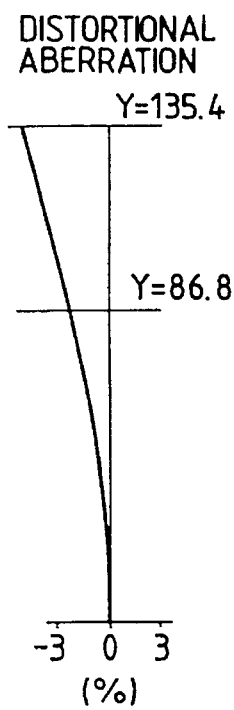

FIGS. 18A to 18C are aberration charts of the 8th embodiment in a state focused to infinity, and FIGS. 19A to 19C are aberration charts when it is focused to an object at a short distance of 1.251 m by reducing the gap $d_{12}$ to 16.447 mm. These aberration charts indicate that the focusing to an object of a short distance can be achieved with satisfactory aberration characteristics, by the advancement of the rear lens group $G_R$.

Figure 20:
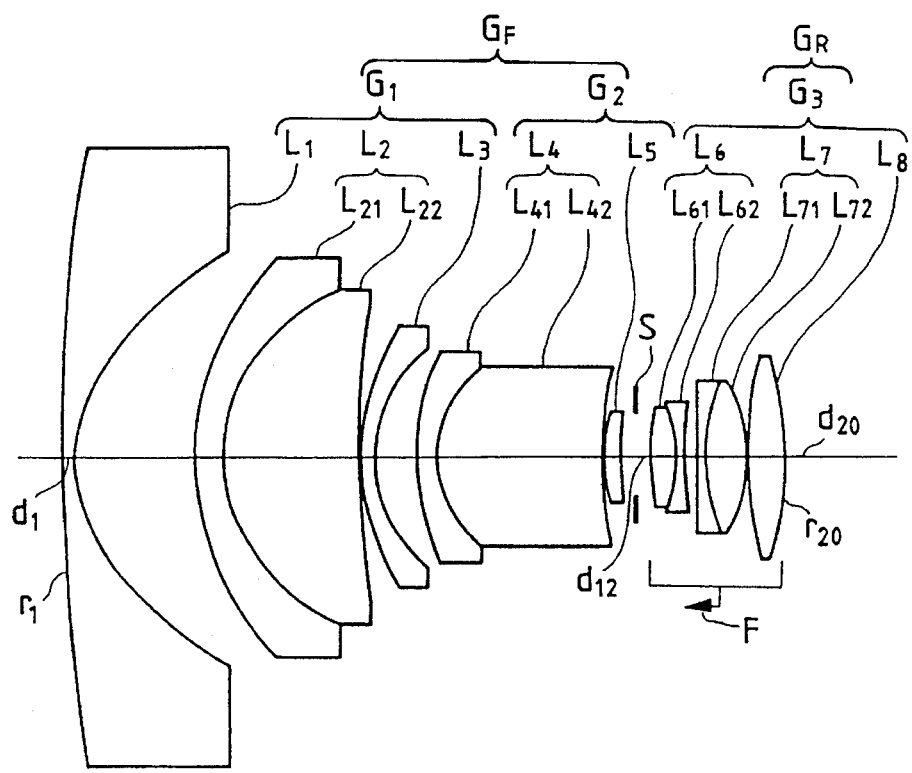
FIG. 20 is a view showing lens configuration of a 9th embodiment of the present invention.

FIG. 20 is a view showing lens configuration of a 9th embodiment of the present invention in a state focused to infinity, and FIGS. 21A to 22C are aberration charts of the 9th embodiment. As shown in FIG. 20, the 9th embodiment is composed, in the order from the object side, of a front lens group $G_F$, a diaphragm S and a rear lens group $G_R$. Said front lens group $G_F$ is composed, in the order from the object side, of a first lens group $G_1$, consisting of a negative meniscus lens $L_1$ convex to the object side, an adhered lens $L_2$ consisting of a negative meniscus lens $L_{21}$ convex to the object side and a positive meniscus lens $L_{22}$ convex to the object side, and a negative meniscus lens $L_3$ convex to the object side; and a second lens group $G_2$ consisting of an adhered lens $L_4$ consisting of a negative meniscus lens $L_{41}$ convex to the object side and a positive meniscus lens $L_{42}$ convex to the object side, and a positive meniscus lens $L_5$ convex to the object side.

The rear lens group $G_R$ consists of a third lens group $G_3$ which is composed, in the order from the object side, of an adhered lens $L_6$ consisting of a biconvex positive lens $L_{61}$ and a biconcave negative lens $L_{62}$, an adhered lens $L_7$ consisting of a biconcave negative lens $L_{71}$ and a biconvex positive lens $L_{72}$, and a biconvex positive $L_8$ having a face of a stronger curvature at the image side.

In the 9th embodiment shown in FIG. 20, the radii $r_i$ of curvature, distances $d_i$ of lens faces, refractive indexes $n_{di}$, and Abbe's numbers $\nu_{di}$ are selected same as those in the 3rd embodiment, as shown in Table 9.

TABLE 9

| (9th embodiment): $f = 100$, $F_{NO} = 3.5$, $2\theta = 110°$ | | | | |
|---|---|---|---|---|
| i | $r_i$ | $d_i$ | $n_{di}$ | $\nu_{di}$ |
| 1 | 1333.575 | 9.868 | 1.74810 | 52.30 |
| *2 | 106.710 | 98.305 | 1.00000 | |
| 3 | 221.380 | 23.026 | 1.71300 | 59.93 |
| 4 | 138.762 | 106.382 | 1.59507 | 35.51 |
| 5 | 923.259 | 1.315 | 1.00000 | |
| 6 | 192.744 | 9.868 | 1.65160 | 58.50 |
| 7 | 109.801 | 32.894 | 1.00000 | |
| 8 | 187.842 | 16.447 | 1.74810 | 52.30 |
| 9 | 88.457 | 132.099 | 1.62004 | 36.27 |
| 10 | 356.513 | 1.315 | 1.00000 | |
| 11 | 139.600 | 13.157 | 1.51680 | 64.10 |
| 12 | 348.181 | 24.342 (variable) | 1.00000 | |
| 13 | 178.124 | 19.736 | 1.51680 | 64.10 |
| 14 | −108.565 | 6.578 | 1.79668 | 45.37 |
| 15 | 311.912 | 11.184 | 1.00000 | |
| 16 | −2911.027 | 4.605 | 1.80384 | 33.92 |

TABLE 9-continued

| (9th embodiment): $f = 100$, $F_{NO} = 3.5$, $2\theta = 110°$ | | | | |
|---|---|---|---|---|
| i | $r_i$ | $d_i$ | $n_{di}$ | $\nu_{di}$ |
| 17 | 158.548 | 34.210 | 1.51680 | 64.10 |
| 18 | −112.805 | 1.315 | 1.00000 | |
| 19 | 342.313 | 29.605 | 1.51680 | 64.10 |
| 20 | −239.277 | 258.613 (variable) | 1.00000 | |

In Table 9, the asterisked face 2 is an aspherical face, and the radius $r_2$ of curvature indicates that on the optical axis. The form of said aspherical face 2 is defined by the aforementioned polynomial (A), with $C=1/r_2$, $C_4=C_6=\ldots=0$ and $\kappa=0$.

The entire lens system of the 9th embodiment has a focal distance f of 100 mm, a rear focal length of 258.6 mm when focused to infinity, a total length of 834.9 mm, an F number $F_{NO}$ of 3.5, and an image angle of 110° (half image angle $\theta=55°$). Also the effective diameter $\phi$ of the negative lens $L_1$ closest to the object is 534 mm for a peripheral light amount of 300%, so that $4 \cdot f \cdot \tan\theta$ is 571 mm. Thus the condition $\phi < 4 \cdot f \cdot \tan\theta$ is easily satisfied.

For the focal distance $f_1$ of the first lens group $G_F$ consisting of the negative lens $L_1$, adhered lens $L_2$ and negative meniscus lens $L_3$ in the front lens group $G_F$, there stands $f_1=-120.2$ mm$=-1.2f$.

In this 9th embodiment, the focusing to an object at a short distance can be achieved, as shown in FIG. 20, by advancement of the entire rear lens group $G_R$ toward the diaphragm S as indicated by an arrow F, by reducing the gap $d_{20}$ between the front and rear lens groups, including the diaphragm S. In this case the rear focal length $d_{20}$ is extended, corresponding to said advancement.

Figure 21A:
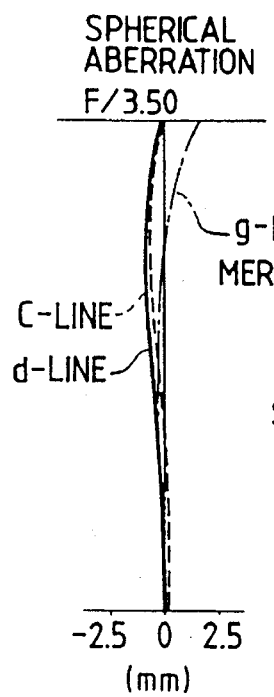
FIGS. 21A, 21B and 21C are aberration charts of said 9th embodiment when focused to infinity.
Figure 21B:
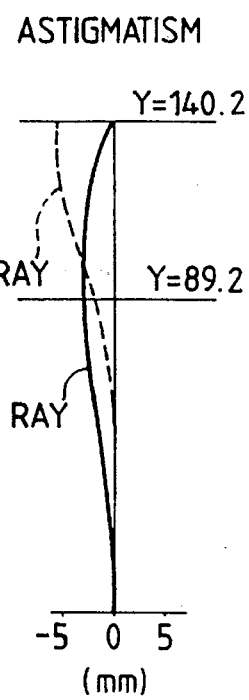
Figure 21C:
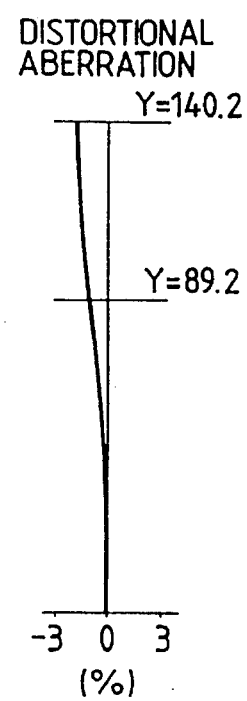
Figure 22A:
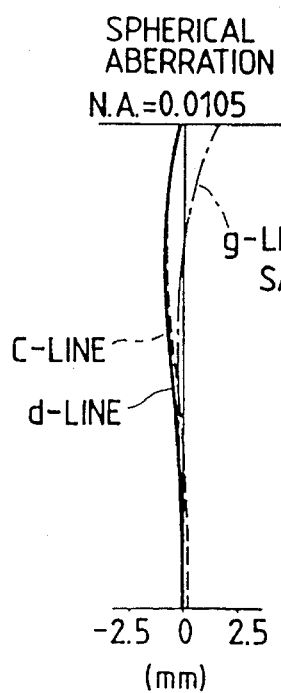
FIGS. 22A, 22B and 22C are aberration charts of said 9th embodiment when focused to a short distance.
Figure 22B:
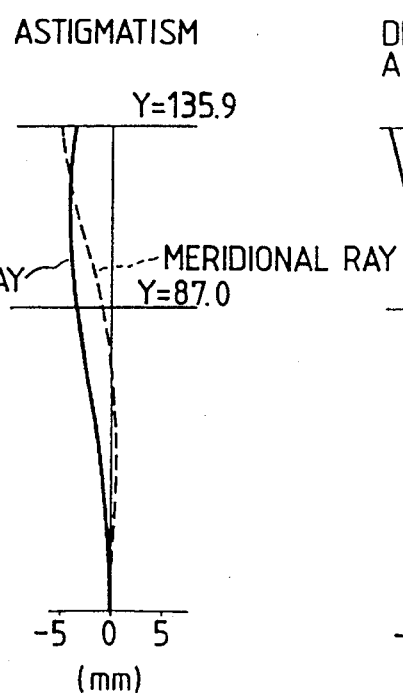
Figure 22C:
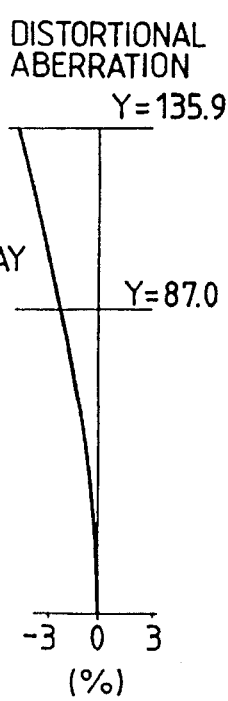

FIGS. 21A to 21C are aberration charts of the 9th embodiment when focused to infinity, and FIGS. 22A to 22C are aberration charts when focused to an object at 1.233 m by reducing the gap $d_{12}$ to 16.447 mm. These aberration charts indicate that the focusing to an object of a short distance can be achieved with satisfactory aberration characteristics, by the advancement of the rear lens group $G_R$.

Figure 23:
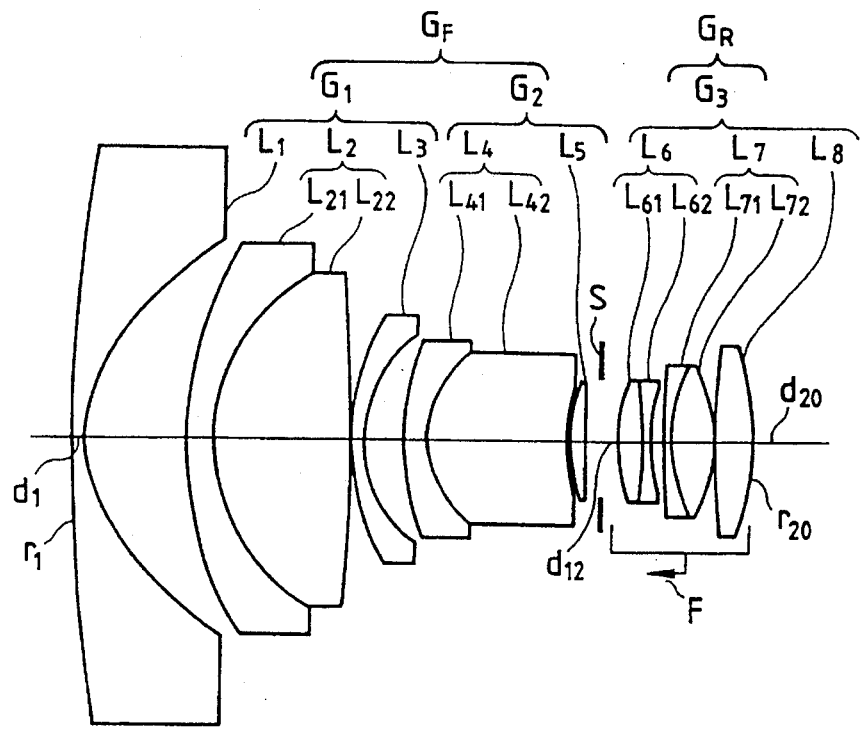
FIG. 23 is a view showing lens configuration of a 10th embodiment of the present invention.

FIG. 23 is a view showing lens configuration of a 10th embodiment of the present invention, in a state focused to infinite distance, and FIGS. 24A to 25C are aberration charts of the 10th embodiment. As shown in FIG. 23, the 10th embodiment is composed, in the order from the object side, of a front lens group $G_F$ of a negative refractive power, a diaphragm S and a rear lens group $G_R$ of a positive refractive power. Said front lens group $G_F$ is composed, in the order from the object side, of a first lens group $G_1$ consisting of a negative meniscus lens $L_1$ convex to the object side, an adhered lens $L_2$ consisting of a negative meniscus lens $L_{21}$ convex to the object side and a biconvex positive lens $L_{22}$, and a negative meniscus lens $L_3$ convex to the object side; and a second lens group $G_2$ consisting of an adhered lens $L_4$ consisting of a negative meniscus lens $L_{41}$ convex to the object side and a positive meniscus lens $L_{42}$ convex to the object side, and a biconvex positive lens $L_5$.

The rear lens group $G_R$ consists of a third lens group $G_3$, which is composed, in the order from the object side, of an adhered lens $L_6$ consisting of a biconvex positive lens $L_{61}$ and a biconcave negative lens $L_{62}$, an adhered lens $L_7$ consisting of a negative meniscus lens $L_{71}$ convex to the object side and a biconvex positive lens $L_{72}$, and a biconvex positive lens $L_8$ having a face of a stronger curvature at the image side.

In the 10th embodiment shown in FIG. 23, the radii $r_i$ of curvature, distances $d_i$ of lens faces, refractive indexes $n_{di}$ and Abbe's numbers $v_{di}$ are selected same as those in the 4th embodiment, as indicated in Table 10.

TABLE 10

(10th embodiment): f = 100, $F_{NO}$ = 2.8, 2θ = 110°

| i | $r_i$ | $d_i$ | $n_{di}$ | $v_{di}$ |
|---|---|---|---|---|
| 1 | 1319.491 | 9.868 | 1.74810 | 52.30 |
| *2 | 108.017 | 82.236 | 1.00000 | |
| 3 | 288.869 | 23.026 | 1.71300 | 59.93 |
| 4 | 147.353 | 108.552 | 1.59507 | 35.51 |
| 5 | −1375.554 | 1.315 | 1.00000 | |
| 6 | 187.777 | 9.868 | 1.65160 | 58.50 |
| 7 | 99.315 | 32.894 | 1.00000 | |
| 8 | 212.517 | 16.447 | 1.74810 | 52.30 |
| 9 | 83.032 | 114.728 | 1.62004 | 36.27 |
| 10 | 217.920 | 1.315 | 1.00000 | |
| 11 | 146.295 | 13.157 | 1.51680 | 64.10 |
| 12 | −986.512 | 24.342 (variable) | 1.00000 | |
| 13 | 120.646 | 19.736 | 1.51680 | 64.10 |
| 14 | −411.297 | 6.578 | 1.79668 | 45.37 |
| 15 | 150.107 | 11.184 | 1.00000 | |
| 16 | 800.896 | 4.605 | 1.80384 | 33.92 |
| 17 | 127.565 | 34.210 | 1.51680 | 64.10 |
| 18 | −136.158 | 1.315 | 1.00000 | |
| 19 | 589.798 | 29.605 | 1.51680 | 64.10 |
| 20 | −220.870 | 248.442 (variable) | 1.00000 | |

In Table 10, the asterisked face 2 is an aspherical face, and the radius $r_2$ of curvature indicates that on the optical axis. The form of said aspherical face is defined by the aforementioned polynomial (A) with $C=1/r_2$, $C_4=C_6=\ldots=0$ and $\kappa=0$.

The entire lens system of the 10th embodiment has a focal distance f of 100 mm, a rear focal length of 248.4 mm when focused to infinity, a total length of 793.4 mm, an F number $F_{NO}$ of 2.8, and an image angle 2θ of 110° (half image angle θ=55°). Also the effective diameter of the negative lens $L_1$ closest to the object is 492 mm, so that 4·f·tanθ is 571 mm. Thus the condition φ<4·f·tanθ is easily satisfied.

Also for the focal length $f_1$ of the first lens group $G_1$ consisting of the negative lens $L_1$, adhered lens $L_2$ and negative meniscus lens $L_3$ in the front lens group $G_F$, there stands $f_1=-117.1$ mm= $-1.17f$.

In this 10th embodiment, the focusing to an object of a short distance can be achieved by advancing the entire rear lens group $G_R$ toward the diaphragm S, as indicated by an arrow F in FIG. 23, reducing the gap $d_{12}$ including the diaphragm S. In this case the rear focal length $d_{20}$ is extended corresponding to said advancement.

Figure 24A:
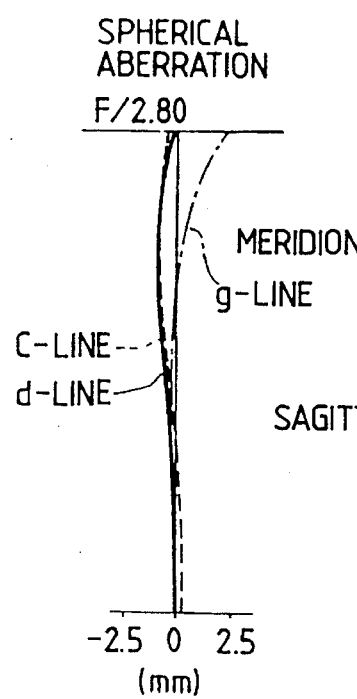
FIGS. 24A, 24B and 24C are aberration charts of said 10th embodiment when focused to infinity.
Figure 24B:
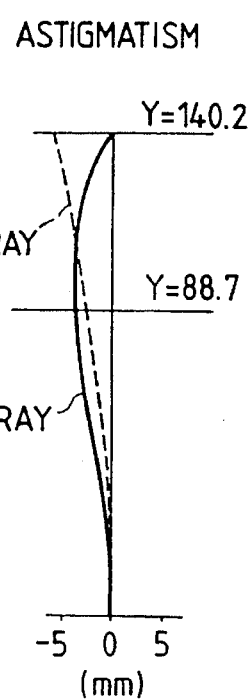
Figure 24C:
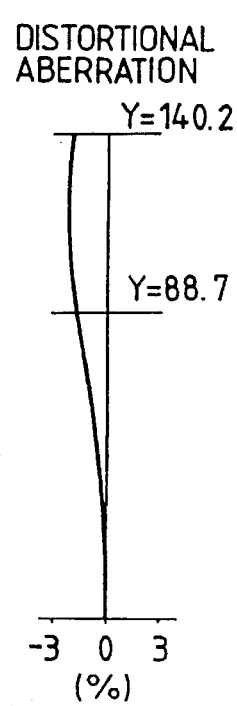
Figure 25A:
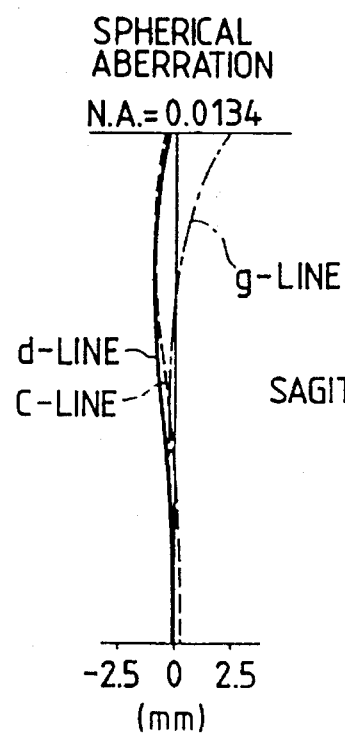
FIGS. 25A, 25B and 25C are aberration charts of said 10th embodiment when focused to a short distance.
Figure 25B:
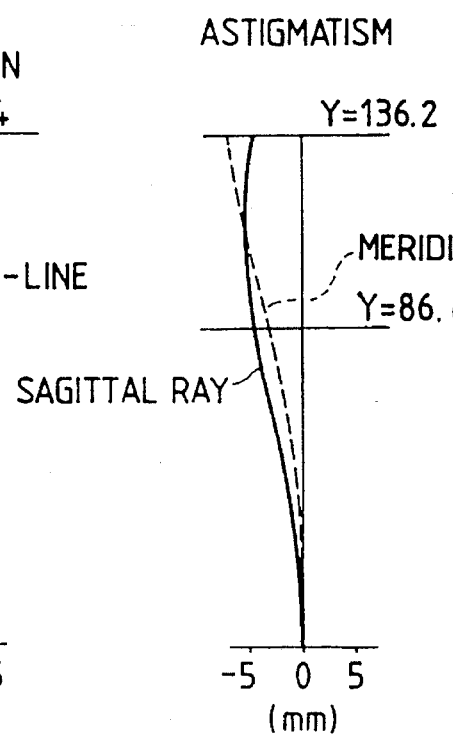
Figure 25C:
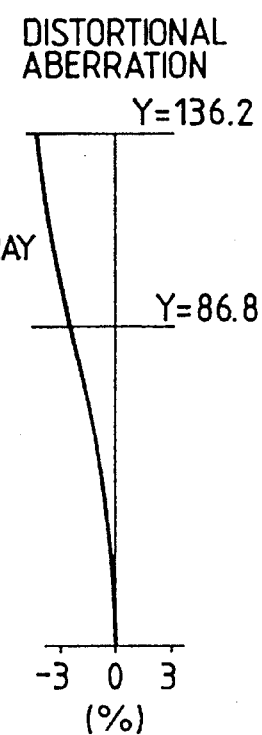

FIGS. 24A to 24C are aberration charts of the 10th embodiment when focused to infinity, and FIGS. 25A to 25C are aberration charts when it is focused to an object at 1.214 m by reducing the gap $d_{12}$ to 16.447 mm. These aberration charts indicate that the focusing to a short distance can be achieved with satisfactory aberration characteristics, by advancement of the rear lens group $G_R$.

Figure 26:
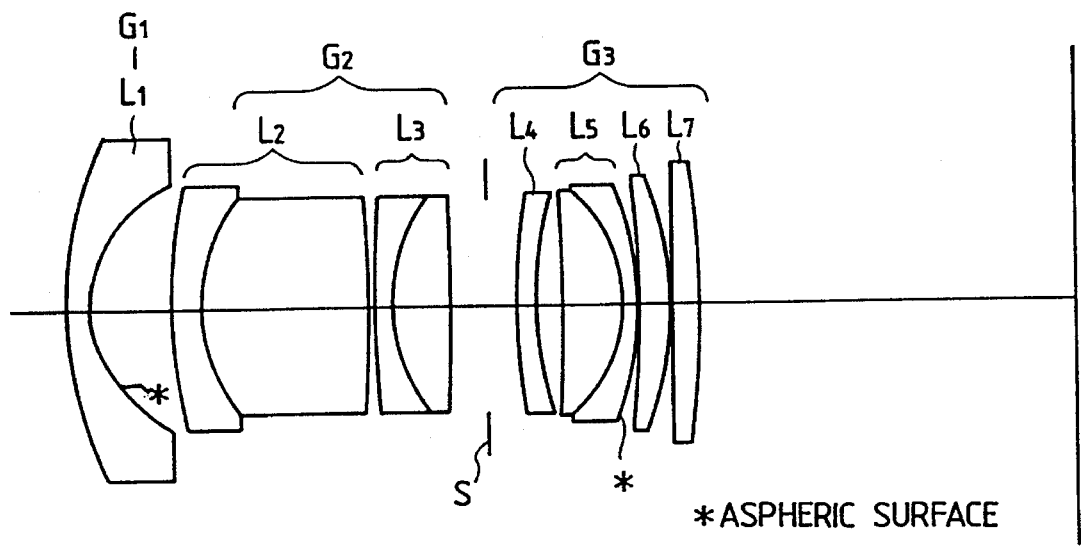
FIG. 26 is a view showing lens configuration of an 11th embodiment of the present invention.

As shown in FIG. 26, an 11th embodiment of the present invention is composed, in the order from the object side, of a 1st lens group $G_1$ of a negative refractive power, a 2nd lens group $G_2$ of a positive refractive power, a diaphragm S, and a 3rd lens group $G_3$ of a positive refractive power. The 1st lens group $G_1$ is composed of a negative meniscus lens $L_1$ convex to the object side, while the 2nd lens group $G_2$ of a positive refractive power is composed of an adhered positive lens $L_2$ consisting of a negative meniscus lens convex to the object side and a positive lens, and an adhered lens $L_3$ of a weak refractive power. The 3rd lens group $G_3$ is composed of a negative meniscus lens $L_4$ convex to the object side, an adhered positive lens $L_5$ consisting of a positive meniscus lens convex to the image side and a negative meniscus lens, a positive meniscus lens $L_6$ convex to the image side, and a positive lens $L_7$ having a face of a stronger curvature at the image side.

Lens parameters and parameters of the aspherical faces of the 11th embodiment are as shown in Table 11.

TABLE 11

(11th embodiment): f = 100.000, $F_{NO}$ = 1.8, 2θ = 84.0°

| i | $r_i$ | $d_i$ | $n_{di}$ | $v_{di}$ |
|---|---|---|---|---|
| 1 | 166.398 | 10.000 | 1.6968 | 55.6 |
| 2 | 50.119 | 35.000 | | |
| 3 | 226.840 | 12.500 | 1.62041 | 60.1 |
| 4 | 75.799 | 70.833 | 1.74950 | 35.2 |
| 5 | −798.914 | 3.000 | | |
| 6 | 607.693 | 7.500 | 1.74950 | 35.2 |
| 7 | 77.846 | 25.000 | 1.71300 | 53.9 |
| 8 | −1430.331 | 29.167 | | |
| 9 | 317.550 | 8.333 | 1.75692 | 31.6 |
| 10 | 164.697 | 10.417 | | |
| 11 | −1178.677 | 25.833 | 1.64006 | 60.0 |
| 12 | −64.710 | 7.500 | 1.75520 | 27.6 |
| 13 | −129.205 | 0.833 | | |
| 14 | −392.316 | 12.500 | 1.74810 | 52.3 |
| 15 | −158.645 | 0.833 | | |
| 16 | 48325.827 | 12.500 | 1.69680 | 55.6 |
| 17 | −370.156 | 158.342 | | |

Figure 27:
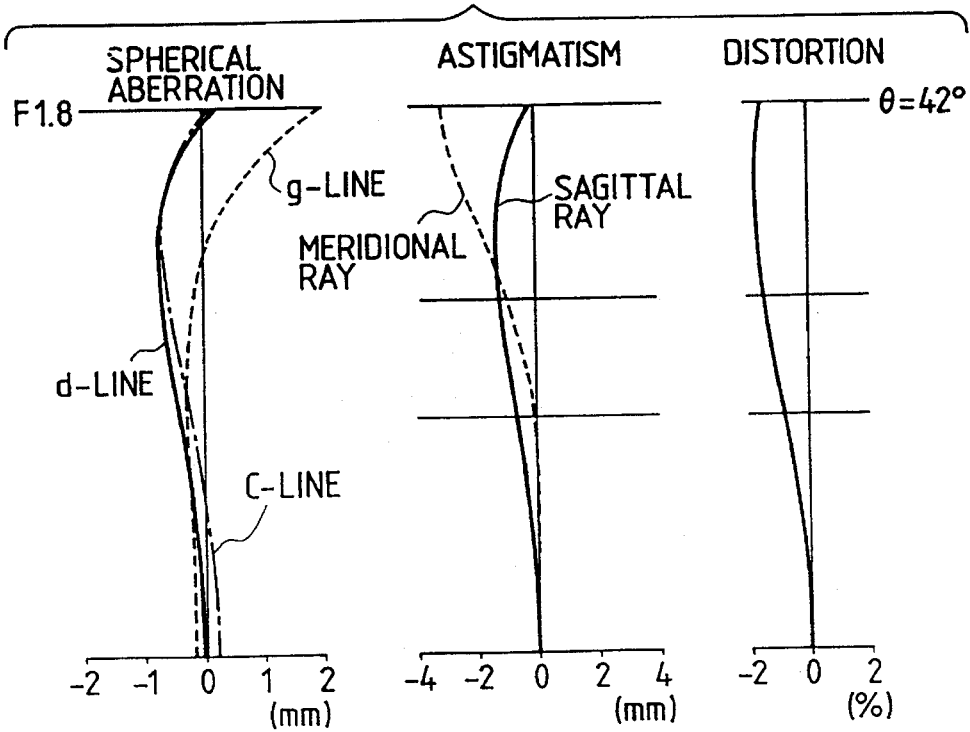
FIG. 27 is aberration charts of said 11th embodiment.

Parameters on aspherical faces
2nd face  $\kappa = 0.527$
   $C_4 = 0.47689 \times 10^{-7}$    $C_8 = 0$
   $C_6 = 0$                          $C_{10} = 0$
   $\kappa = 1.000$
13th face
   $C_4 = 0.21013 \times 10^{-7}$    $C_8 = 0$
   $C_6 = -0.26774 \times 10^{-11}$  $C_{10} = 0$
$f_1/f = -1.067$
$\phi = 172.5 = 2.13f \cdot \tan^2\theta$
$|h_p/r_A| = 0.939$ Aberrations of the 11th embodiment are shown in FIG. 27. These aberration charts indicate that the 11th embodiment has extremely excellent imaging characteristics, despite of a lens configuration having an image angle of 84°, an F-number as low as 1.8 and a small diameter of the lens $L_1$ closest to the object side.

Figure 28:
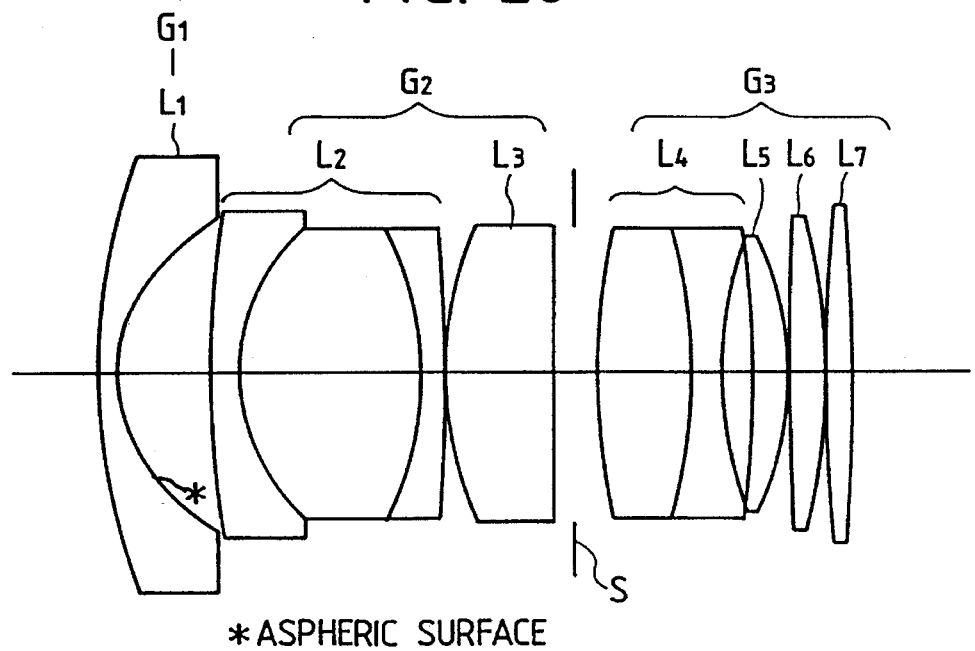
FIG. 28 is a view showing lens configuration of a 12th embodiment of the present invention.

A 12th embodiment of the present invention is also composed, as shown in FIG. 28, in the order from the object side, a 1st lens group $G_1$ of a negative refractive power, a 2nd lens group $G_2$ of a positive refractive power, a diaphragm S, and a 3rd lens group $G_3$ of a positive refractive power. The 1st lens group $G_1$ is composed of a negative meniscus lens $L_1$ convex to the object side, while the 2nd lens group $G_2$ of a positive refractive power is composed of an adhered positive lens $L_2$ consisting of three lenses, namely a negative meniscus lens convex to the object side, a biconvex positive lens and a negative meniscus lens convex to the image side, and a positive lens $L_3$ having a face of a stronger curvature at the object side. The 3rd lens group $G_3$ of a positive refractive power is composed of an adhered positive lens $L_4$ consisting of a biconvex positive lens and a biconcave negative lens, a positive meniscus lens $L_5$ convex to the image side, a positive lens $L_6$ having a face of a stronger curvature at the image side, and a biconvex positive lens $L_7$.

Lens parameters and parameters on the aspherical face of the 12th embodiment are as shown in Table 12.

TABLE 12

(12th embodiment): f = 100.000, $F_{NO}$ = 2.0
2θ = 84.0°

| i | $r_i$ | $d_i$ | $n_{di}$ | $v_{di}$ |
|---|---|---|---|---|
| 1 | 214.393 | 6.161 | 1.63246 | 63.8 |
| 2 | 49.452 | 31.626 | | |
| 3 | 324.095 | 9.858 | 1.80411 | 46.5 |
| 4 | 65.635 | 62.020 | 1.66755 | 42.0 |
| 5 | −102.654 | 8.215 | 1.58913 | 61.1 |
| 6 | −774.419 | 0.411 | | |
| 7 | 131.479 | 36.555 | 1.56883 | 56.0 |
| 8 | −5039.657 | 15.813 | | |
| 9 | 253.995 | 32.037 | 1.67003 | 47.1 |
| 10 | −176.610 | 10.268 | 1.78470 | 26.1 |
| 11 | 133.906 | 10.884 | | |
| 12 | −361.549 | 12.322 | 1.60311 | 60.6 |
| 13 | −96.530 | 0.821 | | |
| 14 | 4517.619 | 11.090 | 1.58913 | 61.1 |
| 15 | −227.130 | 0.411 | | |
| 16 | 636.648 | 8.625 | 1.56384 | 60.7 |
| 17 | −817.920 | 158.852 | | |

Figure 29:
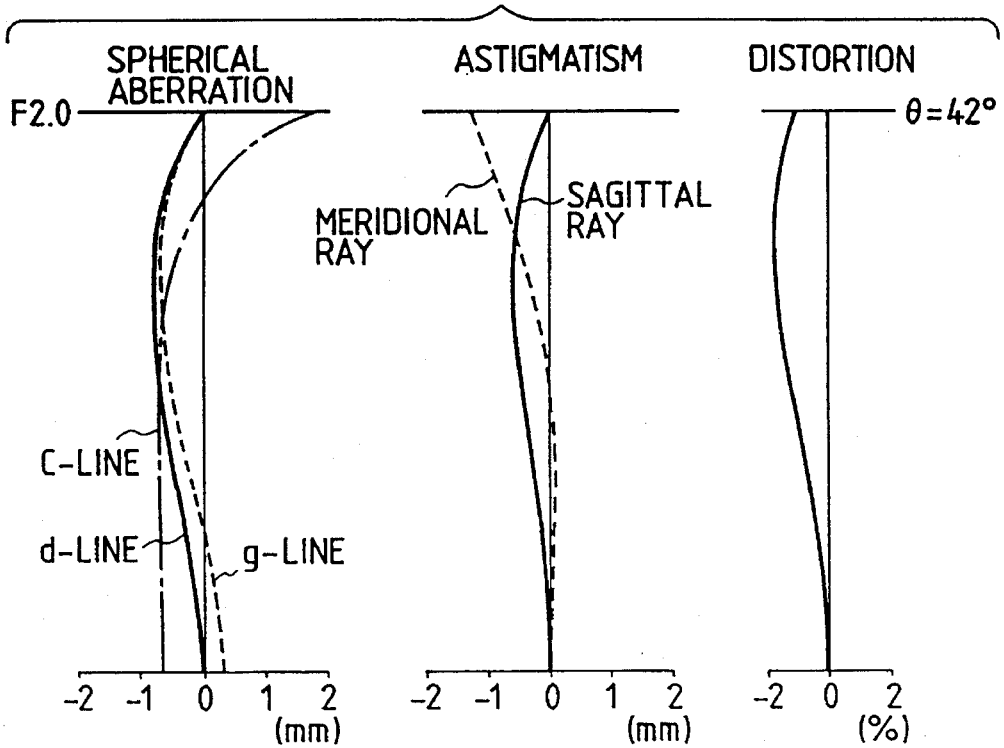
FIG. 29 is aberration charts of said 12th embodiment.

Parameters on aspherical face
2nd face  κ = 0.430
  $C_4 = 0.99719 \times 10^{-7}$    $C_8 = 0$
  $C_6 = 0$    $C_{10} = 0$
$f_1/f = -1.016$
$\phi = 180 = 2.22f \cdot \tan^2\theta$
$|h_p/r_A| = 0.827$ Aberrations of the 12th embodiment are shown in FIG. 29. These aberration charts indicate that the 12th embodiment has extremely excellent imaging characteristics, despite of a lens configuration having an image angle of 84°, an F-number as low as 2.0 and a small diameter of the lens $L_1$ closest to the object side.

As represented in the 11th and 12th embodiments, the present invention can provide a wide angle phototaking lens of a compact size and with satisfactorily corrected aberrations, while attaining a super wide image angle as large as 84° and an F-number as low as 1.8.

Figure 30:
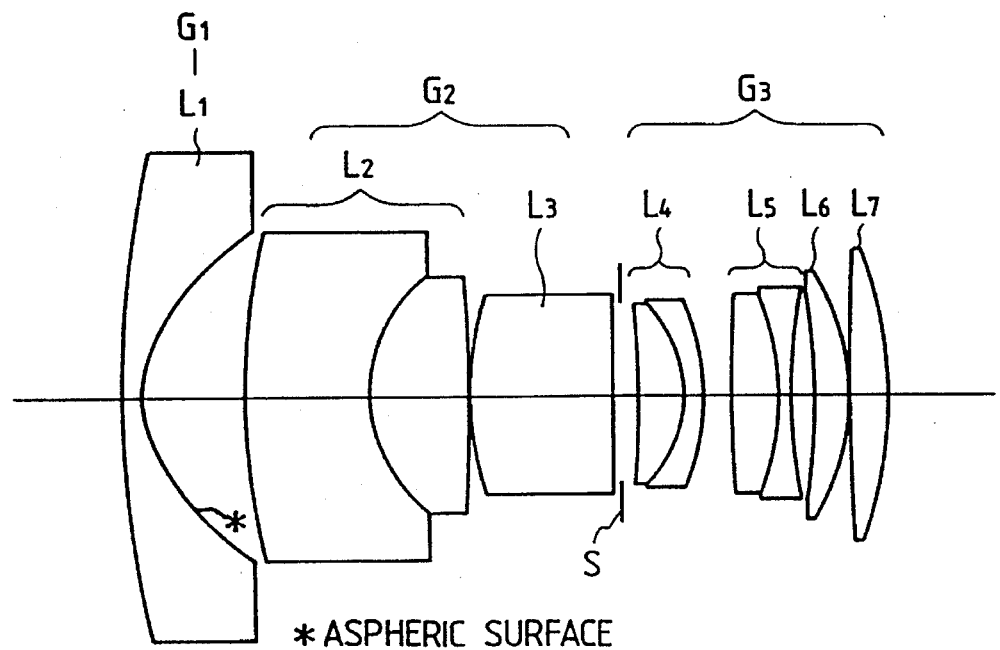
FIG. 30 is a view showing lens configuration of a 13th embodiment of the present invention.

A 13th embodiment of the present invention is also composed, as shown in FIG. 30, in the order from the object side, of a 1st lens group $G_1$ of a negative refractive power, a 2nd lens group $G_2$ of a positive refractive power, a diaphragm S, and a 3rd lens group $G_3$ of a positive refractive power, but provides a super wide image angle, as large as 100°. The 1st lens group $G_1$ is composed of a negative meniscus lens convex to the object side, while the 2nd lens group $G_2$ of a positive refractive power is composed of an adhered positive lens $L_2$ consisting of a negative meniscus lens convex to the object side and a biconvex positive lens, and a positive lens $L_3$ having a face of a stronger curvature at the object side. The 3rd lens group $G_3$ of a positive refractive power is composed of an adhered positive lens $L_4$ consisting of a positive meniscus lens convex to the image side and a negative meniscus lens similarly convex to the image side, an adhered lens $L_5$ consisting of a biconvex lens and a biconcave lens, a positive lens $L_6$ having a face of a stronger curvature at the image side, and a biconvex positive lens $L_7$.

Lens parameters and parameters on the aspherical face of the 13th embodiment are as shown in Table 13.

TABLE 13

(13th embodiment): f = 100.000, $F_{NO}$ = 2.8
2θ = 100.0°

| i | $r_i$ | $d_i$ | $n_{di}$ | $v_{di}$ |
|---|---|---|---|---|
| 1 | 453.027 | 9.783 | 1.63246 | 63.8 |
| 2 | 59.783 | 46.196 | | |
| 3 | 351.331 | 54.348 | 1.80411 | 46.5 |
| 4 | 68.542 | 43.478 | 1.59507 | 35.5 |
| 5 | −1142.440 | 0.543 | | |
| 6 | 137.125 | 65.217 | 1.60717 | 40.3 |
| 7 | ∞ | 11.960 | | |
| 8 | −434.445 | 21.739 | 1.58913 | 61.1 |
| 9 | −55.435 | 8.152 | 1.80218 | 44.7 |
| 10 | −107.065 | 13.315 | | |
| 11 | 763.587 | 22.283 | 1.54739 | 53.5 |
| 12 | −114.098 | 6.522 | 1.80384 | 33.9 |
| 13 | 258.109 | 9.783 | | |
| 14 | −282.179 | 16.304 | 1.62041 | 60.1 |
| 15 | −100.419 | 0.543 | | |
| 16 | 2717.390 | 15.217 | 1.62041 | 60.1 |
| 17 | −203.516 | 205.125 | | |

Figure 31:
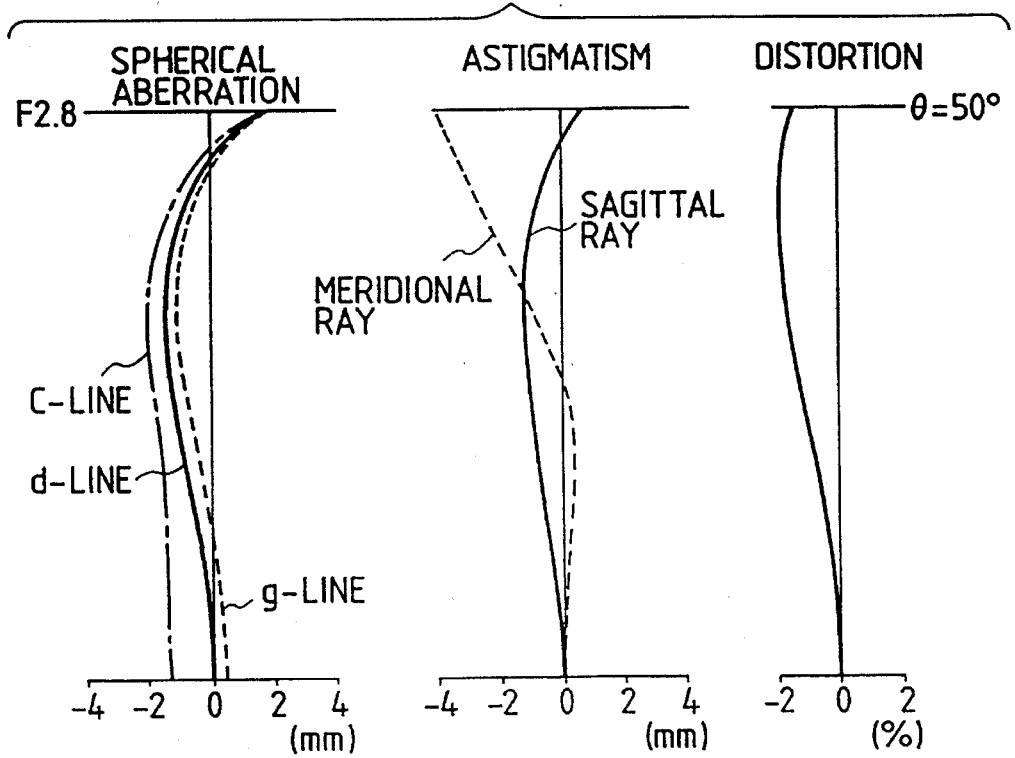
FIG. 31 is aberration charts of said 13th embodiment.

Parameters on aspherical face
2nd face  κ = 0.000
  $C_4 = 0.15574 \times 10^{-6}$    $C_8 = 0$
  $C_6 = 0$    $C_{10} = 0$
$f_1/f = -1.089$
$\phi = 245 = 1.73f \cdot \tan^2\theta$
$|h_p/r_A| = 1.034$ Aberrations of the 13th embodiment are shown in FIG. 31. These aberration charts indicate that the 13th embodiment has extremely excellent imaging characteristics, despite of a lens configuration having a super wide image angle as large as 100°, an F-number as low as 2.8 and a small diameter of the lens $L_1$ closest to the object side.

Figure 32:
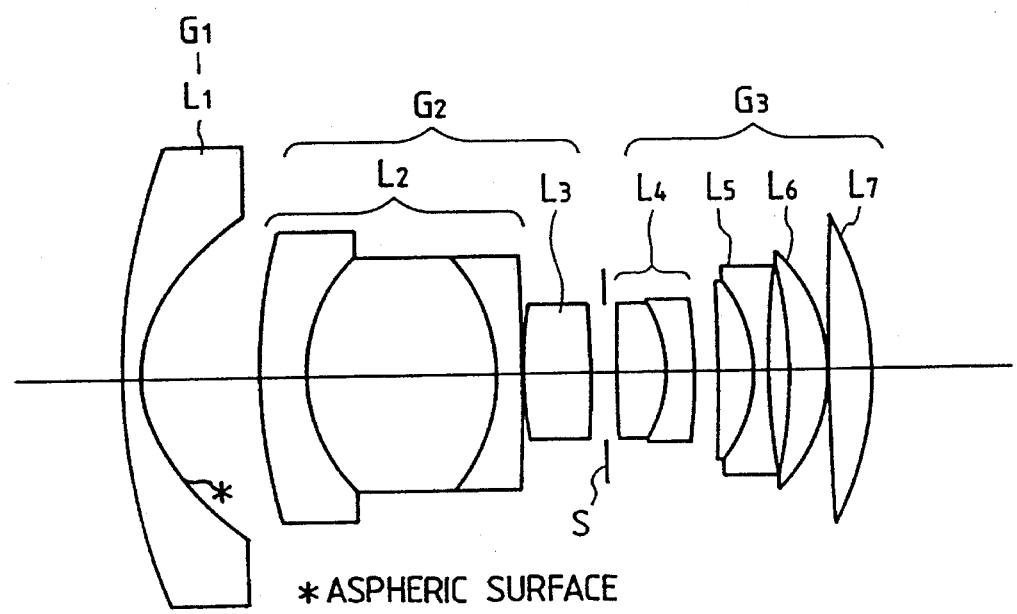
FIG. 32 is a view showing lens configuration of a 14th embodiment of the present invention.

A 14th embodiment is also composed, as shown in FIG. 32, in the order from the object side, of a 1st lens group $G_1$ of a negative refractive power, a 2nd lens group $G_2$ of a positive refractive power, a diaphragm S and a 3rd lens group $G_3$ of a positive refractive power, but provides a super wide image angle as large as 110°. The 1st lens group $G_1$ is composed of a negative meniscus lens $L_1$ convex to the object side, while the 2nd lens group $G_2$ of a positive refractive power is composed of an adhered positive lens $L_2$ consisting of three lenses, namely a negative meniscus lens convex to the object side, a biconvex positive lens and a negative lens, and a biconvex positive lens $L_3$. The 3rd lens group $G_3$ of a positive refractive power is composed of an adhered positive lens $L_4$ consisting of a positive lens and a negative meniscus lens convex to the image side, an adhered lens $L_5$ consisting of a positive lens and a negative lens, a positive lens $L_6$ having a face of a stronger curvature at the image side, and a biconvex positive lens $L_7$.

Lens parameters and parameters on the aspherical face of the 14th embodiment are as shown in Table 14.

TABLE 14

(14th embodiment): f = 100.000, $F_{NO}$ = 3.5
2θ = 110.0°

| i | $r_i$ | $d_i$ | $n_{di}$ | $v_{di}$ |
|---|---|---|---|---|
| 1 | 320.261 | 9.804 | 1.77279 | 49.5 |
| 2 | 73.529 | 63.331 | | |
| 3 | 281.045 | 25.393 | 1.80411 | 46.5 |
| 4 | 84.479 | 103.555 | 1.60342 | 38.0 |
| 5 | −92.924 | 13.072 | 1.69680 | 55.6 |

TABLE 14-continued

| | | | | |
|---|---|---|---|---|
| 6 | −2241.584 | 0.654 | | |
| 7 | 220.832 | 36.601 | 1.60342 | 38.0 |
| 8 | −466.738 | 13.072 | | |
| 9 | 1289.284 | 27.451 | 1.60342 | 38.0 |
| 10 | −67.218 | 15.686 | 1.77279 | 49.5 |
| 11 | −280.933 | 13.072 | | |
| 12 | −1293.096 | 19.551 | 1.57501 | 41.4 |
| 13 | −71.895 | 9.804 | 1.80518 | 25.3 |
| 14 | 494.693 | 9.150 | | |
| 15 | −236.968 | 20.915 | 1.58913 | 61.1 |
| 16 | −90.196 | 0.654 | | |
| 17 | 1669.346 | 23.529 | 1.56384 | 60.7 |
| 18 | −162.792 | 248.439 | | |

Figure 33:
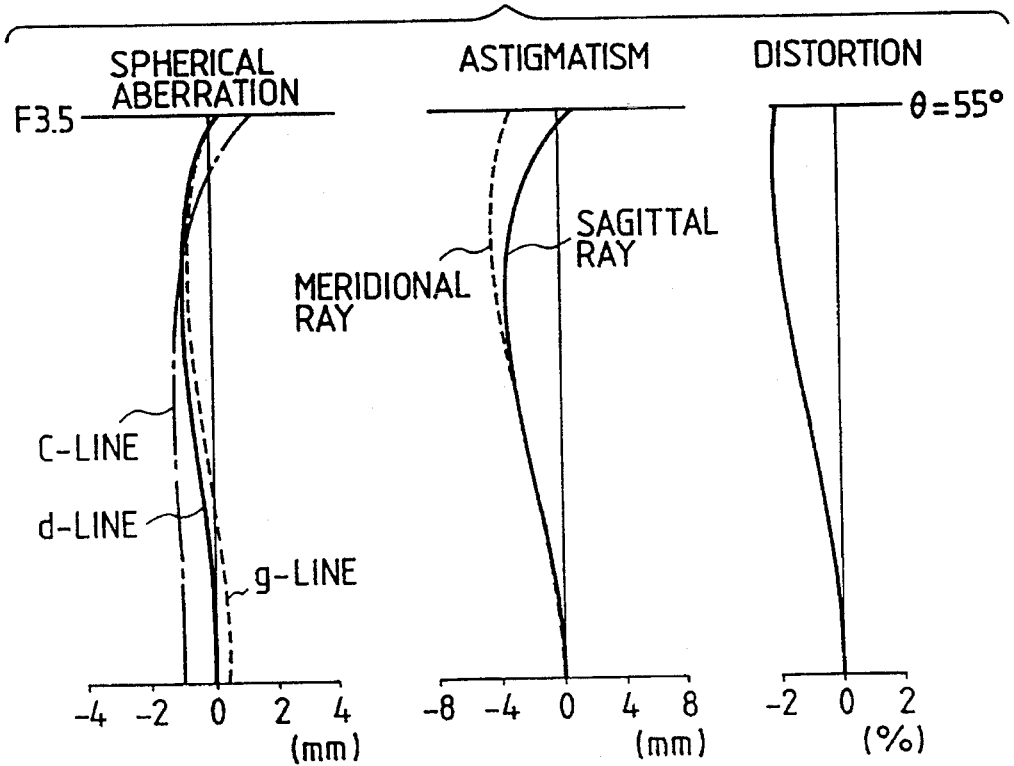
FIG. 33 is aberration charts of said 14th embodiment.
Figure 34:
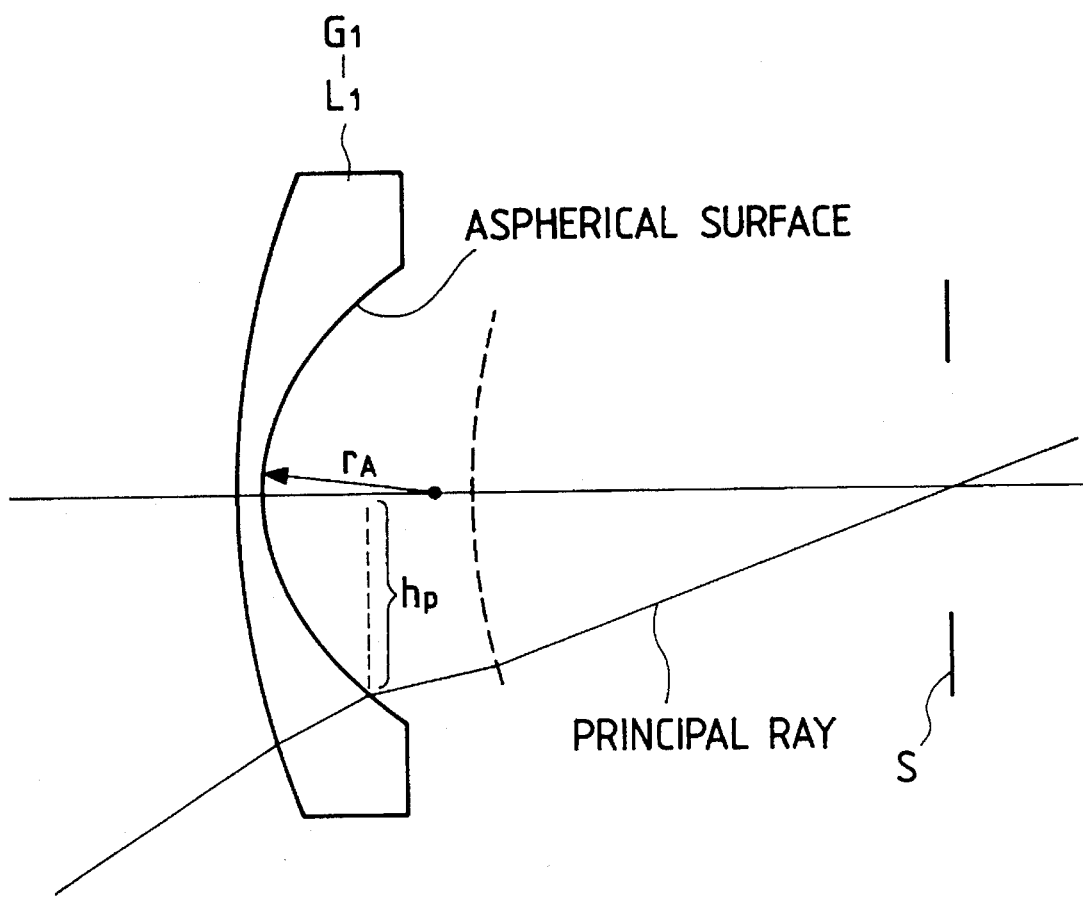
FIG. 34 is a schematic view of the aspherical face in the present invention.

Parameters on aspherical face
2nd face  $\kappa = 0.312$
  $C_4 = 0.34757 \times 10^{-8}$   $C_8 = 0$
  $C_6 = 0$   $C_{10} = 0$
$f_1/f = -1.257$
$\phi = 295 = 1.45f \cdot \tan^2\theta$
$|h_p/r_A| = 1.046$ Aberrations of the 14th embodiment are shown in FIG. 33. These aberration charts indicate that the 14th embodiment has extremely excellent imaging characteristics, despite of a lens configuration having a super wide image angle as large as 110°, an F-number as low as 3.5 and a small diameter of the lens $L_1$ closest to the object side.

In the 1st embodiment shown in FIG. 1 and the 5th embodiment shown in FIG. 9, as in the 7th embodiment shown in FIG. 13, the focusing to a short distance is possible by the movement of the rear lens group $G_R$ or a part thereof ($L_5$, $L_6$, $L_7$) toward the diaphragm S. Also in the 2nd, 3rd, 4th and 6th embodiments respectively shown in FIGS. 3, 5, 7 and 11, the focusing to a short distance is achieved by the movement of the entire rear lens group $G_R$ toward the diaphragm S, as in the 8th, 9th and 10th embodiments respectively shown in FIGS. 17, 20 and 23.

Furthermore, the present invention is naturally not limited by the foregoing embodiments but is subject to various modifications within the scope and spirit of the appended claims.

According to the present invention, as the concave face at the image side of the negative lens $L_1$ in the front lens group $G_F$ is formed as an aspherical face of which curvature monotonously decreases with the distance from the optical axis, the distortion aberration and the coma aberration can be simultaneously corrected, and the addition of a positive lens for correcting the distortion becomes unnecessary. Thus there can be obtained advantages of simplifying the lens configuration and reducing the lens volume. Also the image plane curvature can be easily corrected by the rear lens group. Therefore, the front lens group $G_F$ and the diaphragm S can be maintained constant in relative position to the image plane, and the focusing to the object at an arbitrary distance can be achieved with satisfactory aberration characteristics by merely moving the rear lens group $G_R$ or a part thereof.

Since the rear lens group $G_R$ is smaller in volume and lighter in weight than the front lens group $G_F$, the mechanism for moving said rear lens group $G_R$ can be made simpler than the mechanism required for moving the entire system including the diaphragm. Also since such moving mechanism has a lighter load, the response speed can be made faster in the automatic focusing operation. Furthermore, since the coma aberration can be corrected by both the front and rear lens groups, the aberration is less even in case of eventual misalignment resulting from the movement for focusing.

Furthermore, if the cross-sectional shape of the concave face of said negative lens $L_1$ is represented by the aforementioned aspherical polynomial (A), consisting of the first term representing a second-order curve with the conical constant $\kappa$ within a range from −5 to 0.5 and subsequent additional terms, the effect of the aspherical face is emphasized and the condition of monotonous decrease of curvature with the distance from the optical axis can be securely satisfied. Also if the maximum effective diameter $\phi$ of the entire system is selected smaller than $4 \cdot f \cdot \tan\theta$ wherein f is the focal distance of the entire system and $\theta$ is the half image angle, the maximum effective diameter can be made small even for an ultra wide image angle, and the lens volume can be maintained small. Also this fact reduces the coma aberration, thereby alleviating the burden of aberration correction in the rear lens group $G_R$ positioned behind the diaphragm S and having a positive refractive power, whereby the lens configuration can be simplified. Furthermore, the reduced coma aberration allows to obtain sufficient light amount in the peripheral areas of the image frame, which is often found deficient in the wide angle lenses.

What is claimed is:

1. An inverse telescopic wide angle lens comprising:

a diaphragm;

a front lens group of an integral positive or negative refractive power, positioned in the object side in front of said diaphragm and having a first lens group of a negative refractive power including a negative lens of which an image-side air-contacting surface is formed as an aspherical surface concave to the image side, and a second lens group of a positive refractive power positioned between said first lens group and said diaphragm; and a rear lens group of an integral positive refractive power, positioned behind said diaphragm and having plural lenses;

wherein said negative lens in said first lens group is so constructed that the absolute value of the refractive power of said concave surface on the optical axis is larger than that of the refractive power of the surface at the object side on the optical axis, that the curvature of said concave surface decreases monotonously with the distance from the optical axis, and that the form of said concave surface of said negative lens at the image side, when represented by an equation:

$$x = Cy^2/\{1+(1-\kappa C^2 y^2)^{1/2}\} + C_4 y^4 + C_6 y^6 + \ldots$$

defining the axial distance x from the peak point of a curve constituting said aspherical surface as a function of the distance y of said curve from the optical axis, with a curvature C at said peak point of the curve, a conical constant $\kappa$ and aspherical constants $C_4, C_6, \ldots$, satisfies a condition $-5 < \kappa < 0.5$; and said aspherical surface satisfies a condition:

$$0.8 < |h_p/r_A| < 1.5$$

wherein $r_A$ is the paraxial radius of curvature of said aspherical surface and $h_p$ is the height, from the optical axis, of the crossing point of the principal ray at the maximum image angle on said aspherical surface.

2. An inverse telescopic wide angle lens according to claim 1, wherein said first lens group is so constructed as to further satisfy a condition:

$$0.4 < |f_1/f| < 2.0$$

wherein f is the focal distance of the entire lens system, and $f_1$ is the focal distance of said first lens group.

3. An inverse telescopic wide angle lens according to claim 1, wherein the concave surface, at the image side, of said negative lens in said first lens group is formed as a parabolic surface satisfying the following condition:

$$x = y^2/2 \cdot r_2 (\kappa=0, C_4, C_6, \ldots =0)$$

defining the distance x along the optical axis from the peak point of said curved surface as a function of distance y of said curved surface from the optical axis, wherein $r_2$ is the radius of curvature at said peak point of the curved surface.

4. An inverse telescopic wide angle lens according to claim 1, wherein said first lens group in said front lens group is composed solely of a negative meniscus lens convex to the object side, and having a concave surface at the image side, formed as an aspherical surface of which curvature decreases monotonously with the distance from the optical axis; said second lens group is composed, in the order from the object side, of an adhered lens consisting of a negative meniscus lens convex to the object side and a positive meniscus lens convex to the object side, and a biconvex positive lens; and said rear lens group is composed, in the order from the object side, of an adhered lens consisting of a positive meniscus lens convex to the image side and a negative meniscus Lens convex to the image side, an adhered lens consisting of a positive meniscus Lens convex to the image side and a biconcave negative lens, a positive meniscus lens convex to the image side, and a biconvex positive lens having a surface of a stronger curvature at the image side.

5. An inverse telescopic wide angle lens according to claim 1, wherein said first lens group in said front lens group is composed, in the order from the object side, of a negative meniscus lens convex to the object side, having a concave surface at the image side, formed as an aspherical surface of which curvature decreases monotonously with the distance from the optical axis, an adhered lens consisting of a biconvex positive lens and a negative meniscus lens convex to the image side, and a negative meniscus lens convex to the object side; said second lens group is composed, in the order from the object side, of an adhered lens consisting of a biconvex positive lens and a biconcave negative lens, and a biconvex positive lens; and said rear lens group is composed, in the order from the object side, of an adhered lens consisting of a biconvex positive lens and a biconcave negative lens, an adhered lens consisting of a biconcave negative lens and a biconvex positive lens, and a biconvex positive lens having a surface of a stronger curvature at the image side.

6. An inverse telescopic wide angle lens according to claim 1, wherein said first lens group in said front lens group is composed, in the order from the object side, of a negative meniscus lens convex to the object side, having a concave surface at the image side, formed as an aspherical surface of which curvature decreases monotonously with the distance from the optical axis, an adhered lens consisting of a negative meniscus lens convex to the object side and a positive meniscus lens convex to the object side, and a negative meniscus lens convex to the object side; said second lens group is composed, in the order from the object side, of an adhered lens consisting of a negative meniscus lens convex to the object side and a positive meniscus lens convex to the object side, and a positive meniscus lens convex to the object side; and said rear lens group is composed, in the order from the object side, of an adhered lens consisting of a biconvex lens and a biconcave lens, an adhered lens consisting of a biconcave lens and a biconvex lens, and a biconvex positive lens having a surface of a stronger curvature at the image side.

7. An inverse telescopic wide angle lens according to claim 1, wherein said first lens group in said front lens group is composed, in the order from the object side, of a negative meniscus lens convex to the object side, having a concave surface at the image side, formed as an aspherical surface of which curvature decreases monotonously with the distance from the optical axis, an adhered lens consisting of a negative .meniscus lens convex to the object side and a biconvex positive lens, and a negative meniscus lens convex to the object side; said second lens group is composed, in the order from the object side, of an adhered lens consisting of a negative meniscus lens convex to the object side and a positive meniscus lens convex to the object side, and a biconvex positive lens; and said rear lens group is composed, in the order from the object side, of an adhered lens consisting of a biconvex positive lens and a biconcave negative lens, an adhered lens consisting of a negative meniscus lens convex to the object side and a biconvex positive lens, and a biconvex positive lens having a surface of a stronger curvature at the image side.

8. An inverse telescopic wide angle lens according to claim 1, wherein said first lens group in said front lens group is composed solely of an adhered lens consisting of a planoconvex positive lens convex to the object side and a planoconcave negative lens having a concave surface at the image side, formed as an aspherical surface of which curvature decreases monotonously with the distance from the optical axis; said second lens group is composed, in the order from the object side, of an adhered lens consisting of a negative meniscus lens convex to the object side and a positive meniscus lens convex to the object side, and a biconvex positive lens; and said rear lens group is composed, in the order from the object side, of an adhered lens consisting of a positive meniscus lens convex to the image side and a negative meniscus lens convex to the image side, a biconcave negative lens, a positive meniscus lens convex to the image side, and a biconvex positive lens having a surface of a stronger curvature at the image side.

9. An inverse telescopic wide angle lens according to claim 1, wherein said first lens group in said front lens group is composed solely of a negative meniscus lens convex to the object side and having a concave surface at the image side, formed as an aspherical surface of which curvature decreases monotonously with the distance from the optical axis; said second lens group is composed, in the order from the object side, of an adhered lens consisting of a negative meniscus lens convex to the object side and a biconvex positive lens, and an adhered lens consisting of a biconvex positive lens and a negative meniscus lens concave to the object side; and said rear lens group is composed, in the order from the object side, of an adhered lens consisting of a positive meniscus lens convex to the image side and a biconcave negative lens, a positive meniscus lens convex to the image side, and a biconvex positive lens having a surface of a stronger curvature at the image side.

10. An inverse telescopic wide angle lens according to claim 1, constructed according to the following data, wherein $r_i$ is the radius of curvature of an i-th surface (i=1, 2, 3, . . . ) numbered from the object side, $d_i$ is the axial distance between i-th and (i+1)-th lens surfaces, $n_{di}$ is the refractive index for d-line, of the medium between the i-th and (i+1)-th surfaces, and $v_{di}$ is Abbe's number of the medium between the i-th and (i+1)-th surfaces (Abbe's number for air being left blank), $F_{NO}$ is the F number, and asterisk (*) indicates an aspherical surface:

| | f = 100, $F_{NO}$ = 2.8, 2θ = 100° | | | |
|---|---|---|---|---|
| i | $r_i$ | $d_i$ | $n_{di}$ | $v_{di}$ |
| 1 | 736.951 | 5.490 | 1.77279 | 49.45 |
| *2 | 99.559 | 105.968 | 1.00000 | |
| 3 | 227.925 | 26.847 | 1.77279 | 45.45 |
| 4 | 86.498 | 106.517 | 1.60342 | 38.03 |
| 5 | 848.627 | 1.647 | 1.00000 | |
| 6 | 159.826 | 43.924 | 1.60342 | 38.03 |
| 7 | −6698.393 | 16.471 | 1.00000 | |
| 8 | −3216.170 | 19.766 | 1.57501 | 41.42 |
| 9 | −58.390 | 10.981 | 1.74810 | 52.30 |
| 10 | −210.440 | 11.530 | 1.00000 | |
| 11 | −283.318 | 28.002 | 1.80411 | 46.55 |
| 12 | −104.074 | 5.490 | 1.80518 | 25.35 |
| 13 | 333.225 | 7.686 | 1.00000 | |
| 14 | −226.181 | 14.824 | 1.62041 | 60.14 |
| 15 | −93.959 | 1.098 | 1.00000 | |
| 16 | 458.139 | 19.217 | 1.62041 | 60.14 |
| 17 | −219.467 | 205.941 | 1.00000 | |

$|h_p/r_A| = 0.900$
conical constant κ = 0.

11. An inverse telescopic wide angle lens according to claim 1, constructed according to the following data, wherein $r_i$ is the radius of curvature of an i-th surface (i=1, 2, 3 . . . ) numbered from the object side, $d_i$ is the axial distance between i-th and (i+1)-th lens surfaces, $n_{di}$ is the refractive index, for d-line, of the medium between the i-th and (i+1)-th surfaces, and $v_{di}$ is Abbe's number of the medium between the i-th and (i+1)-th surfaces (Abbe's number for air being left blank), $F_{NO}$ is the F number, and asterisk (*) indicates an aspherical surface:

| | f = 100, $F_{NO}$ = 3.5, 2θ = 110° | | | |
|---|---|---|---|---|
| i | $r_i$ | $d_i$ | $n_{di}$ | $v_{di}$ |
| 1 | 1141.843 | 9.868 | 1.77279 | 49.45 |
| *2 | 94.601 | 85.526 | 1.00000 | |
| 3 | 590.915 | 85.449 | 1.61293 | 36.98 |
| 4 | −210.851 | 71.236 | 1.71300 | 53.93 |
| 5 | −495.018 | 1.315 | 1.00000 | |
| 6 | 139.541 | 9.868 | 1.65160 | 58.50 |
| 7 | 97.296 | 23.026 | 1.00000 | |
| 8 | 176.250 | 39.473 | 1.62004 | 36.27 |
| 9 | −201.482 | 84.210 | 1.80411 | 46.55 |
| 10 | 208.521 | 1.315 | 1.00000 | |
| 11 | 131.381 | 13.157 | 1.58144 | 40.76 |
| 12 | −540.218 | 24.342 | 1.00000 | |
| 13 | 211.677 | 19.736 | 1.51680 | 64.10 |
| 14 | −96.540 | 6.578 | 1.79631 | 40.90 |
| 15 | 243.213 | 7.894 | 1.00000 | |
| 16 | −3841.914 | 4.605 | 1.79504 | 28.57 |
| 17 | 159.372 | 34.210 | 1.51680 | 64.10 |
| 18 | −110.558 | 1.315 | 1.00000 | |
| 19 | 1646.110 | 23.026 | 1.51680 | 64.10 |
| 20 | −172.890 | 250.995 | 1.00000 | |

$|h_p/r_A| = 1.194$
conical constant κ = 0.

12. An inverse telescopic wide angle lens according to claim 1, constructed according to the following data, wherein $r_i$ is the radius of curvature of an i-th surface (i=1, 2, 3 . . . ) numbered from the object side, $d_i$ is the axial distance between i-th and (i+1)-th lens surfaces, $n_{di}$ is the refractive index, for d-line, of the medium between the i-th and (i+1)-th surfaces, and $v_{di}$ is Abbe's number of the medium between the i-th and (i+1)-th surfaces (Abbe's number for air being left blank), $F_{NO}$ is the F number, and asterisk (*) indicates an aspherical surface:

| | f = 100, $F_{NO}$ = 3.5, 2θ = 110° | | | |
|---|---|---|---|---|
| i | $r_i$ | $d_i$ | $n_{di}$ | $v_{di}$ |
| 1 | 1333.575 | 9.868 | 1.74810 | 52.30 |
| *2 | 106.710 | 98.305 | 1.00000 | |
| 3 | 221.380 | 23.026 | 1.71300 | 53.93 |
| 4 | 138.762 | 106.382 | 1.59507 | 35.51 |
| 5 | 923.259 | 1.315 | 1.00000 | |
| 6 | 192.744 | 9.868 | 1.65160 | 58.50 |
| 7 | 109.801 | 32.894 | 1.00000 | |
| 8 | 187.842 | 16.447 | 1.74810 | 52.30 |
| 9 | 88.457 | 132.099 | 1.62004 | 36.27 |
| 10 | 356.513 | 1.315 | 1.00000 | |
| 11 | 139.600 | 13.157 | 1.51680 | 64.10 |
| 12 | 348.181 | 24.342 | 1.00000 | |
| 13 | 178.124 | 19.736 | 1.51680 | 64.10 |
| 14 | −108.565 | 6.578 | 1.79668 | 45.37 |
| 15 | 311.912 | 11.184 | 1.00000 | |
| 16 | −2911.027 | 4.605 | 1.80384 | 33.92 |
| 17 | 158.548 | 34.210 | 1.51680 | 64.10 |
| 18 | −112.805 | 1.315 | 1.00000 | |
| 19 | 342.313 | 29.605 | 1.51680 | 64.10 |
| 20 | −239.277 | 258.613 | 1.00000 | |

$|h_p/r_A| = 1.348$
conical constant κ = 0.

13. An inverse telescopic wide angle lens according to claim 1, constructed according to the following data, wherein $r_i$ is the radius of curvature of an i-th surface (i=1, 2, 3, . . . ) numbered from the object side, $d_i$ is the axial distance between i-th and (i+1)-th lens surfaces, $n_{di}$ is the refractive index for d-line, of the medium between the i-th and (i+1)-th surfaces $v_{di}$ is Abbe's number of the medium between the i-th and (i+1)-th faces (Abbe's number for air being left blank), $F_{NO}$ is the F number, and asterisk (*) indicates as aspherical surface:

| | f = 100, $F_{NO}$ = 2.8, 2θ = 110° | | | |
|---|---|---|---|---|
| i | $r_i$ | $d_i$ | $n_{di}$ | $v_{di}$ |
| 1 | 1319.491 | 9.868 | 1.74810 | 52.30 |
| *2 | 108.017 | 82.236 | 1.00000 | |
| 3 | 288.869 | 23.026 | 1.71300 | 53.93 |
| 4 | 147.353 | 108.552 | 1.59507 | 35.51 |
| 5 | −1375.554 | 1.315 | 1.00000 | |
| 6 | 187.777 | 9.868 | 1.65160 | 58.50 |
| 7 | 99.315 | 32.894 | 1.00000 | |
| 8 | 212.517 | 16.447 | 1.74810 | 52.30 |
| 9 | 83.032 | 114.728 | 1.62004 | 36.27 |
| 10 | 217.920 | 1.315 | 1.00000 | |
| 11 | 146.295 | 13.157 | 1.51680 | 64.10 |
| 12 | −986.512 | 24.342 | 1.00000 | |
| 13 | 120.646 | 19.736 | 1.51680 | 64.10 |
| 14 | −411.297 | 6.578 | 1.79668 | 45.37 |
| 15 | 150.107 | 11.184 | 1.00000 | |
| 16 | 800.896 | 4.605 | 1.80384 | 33.92 |
| 17 | 127.565 | 34.210 | 1.51680 | 64.10 |
| 18 | −136.158 | 1.315 | 1.00000 | |
| 19 | 589.798 | 29.605 | 1.51680 | 64.10 |
| 20 | −220.870 | 248.442 | 1.00000 | |

$|h_p/r_A| = 1.211$
conical constant κ = 0.

14. An inverse telescopic wide angle lens according to claim 1, constructed according to the following data, wherein $r_i$ is the radius of curvature of an i-th surface (i=1, 2, 3, . . . ) numbered from the object side, $d_i$ is the axial distance between i-th and (i+1)-th lens surfaces, $n_{di}$ is the refractive index, for d-line, of the medium between the i-th and (i+1)-th surfaces, $v_{di}$ is Abbe's number of the medium between the i-th and (i+1)-th surfaces (Abbe's number for air being left blank), $F_{NO}$ is the F number, and asterisk (*) indicates an aspherical surface:

| \multicolumn{5}{c}{$f = 100, F_{NO} = 2.8, 2\theta = 100°$} | | | | |
|---|---|---|---|---|
| i | $r_i$ | $d_i$ | $n_{di}$ | $v_{di}$ |
| 1 | 765.025 | 21.857 | 1.78470 | 26.05 |
| 2 | ∞ | 5.464 | 1.77279 | 49.45 |
| *3 | 97.480 | 105.464 | 1.00000 | |
| 4 | 191.485 | 24.590 | 1.77279 | 49.45 |
| 5 | 81.967 | 107.650 | 1.60342 | 38.02 |
| 6 | 497.718 | 1.639 | 1.00000 | |
| 7 | 157.923 | 43.715 | 1.62374 | 47.10 |
| 8 | −8253.032 | 16.393 | 1.00000 | |
| 9 | −790.556 | 19.672 | 1.58913 | 61.09 |
| 10 | −55.464 | 10.928 | 1.74443 | 49.52 |
| 11 | −183.059 | 11.475 | 1.00000 | |
| 12 | −250.013 | 29.508 | 1.80518 | 25.35 |
| 13 | 353.551 | 10.928 | 1.00000 | |
| 14 | −245.901 | 14.754 | 1.62041 | 60.14 |
| 15 | −98.360 | 1.092 | 1.00000 | |
| 16 | 398.906 | 20.764 | 1.62041 | 60.14 |
| 17 | −216.742 | 201.662 | 1.00000 | |

$|h_p/r_A| = 0.927$
effective diameter φ 275 mm,
$4 \cdot f \cdot \tan\theta = 416$ mm,
conical constant κ = 0.

15. An inverse telescopic wide angle lens according to claim 1, constructed according to the following data, wherein $r_i$ is the radius of curvature of an i-th surface (i=1, 2, 3, ...) numbered from the object side, $d_i$ is the axial distance between i-th and (i+1)-th lens surfaces, $n_{di}$ is the refractive index, for d-line, of the medium between the i-th and (i+1)-th surfaces, $v_{di}$ is Abbe's number of the medium between the i-th and (i+1)-th surfaces (Abbe's number for air being left blank), $F_{NO}$ is the F number, and asterisk (*) indicates an aspherical surface:

| \multicolumn{5}{c}{$f = 100, F_{NO} = 2.8, 2\theta = 100°$} | | | | |
|---|---|---|---|---|
| i | $r_i$ | $d_i$ | $n_{di}$ | $v_{di}$ |
| 1 | 979.796 | 5.413 | 1.77279 | 49.45 |
| *2 | 94.079 | 99.066 | 1.00000 | |
| 3 | 276.586 | 29.774 | 1.77279 | 49.45 |
| 4 | 126.733 | 104.566 | 1.62004 | 36.27 |
| 5 | −525.890 | 18.135 | 1.00000 | |
| 6 | 169.788 | 43.307 | 1.57501 | 41.42 |
| 7 | −71.525 | 10.826 | 1.74810 | 52.30 |
| 8 | −3830.195 | 16.240 | 1.00000 | |
| 9 | −16113.440 | 37.352 | 1.77279 | 49.45 |
| 10 | −104.122 | 10.826 | 1.80518 | 25.35 |
| 11 | 234.356 | 7.037 | 1.00000 | |

-continued

| \multicolumn{5}{c}{$f = 100, F_{NO} = 2.8, 2\theta = 100°$} | | | | |
|---|---|---|---|---|
| i | $r_i$ | $d_i$ | $n_{di}$ | $v_{di}$ |
| 12 | −303.505 | 14.616 | 1.62041 | 60.14 |
| 13 | −98.727 | 1.082 | 1.00000 | |
| 14 | 751.268 | 18.947 | 1.62041 | 60.14 |
| 15 | −212.510 | 206.762 | 1.00000 | |

$|h_p/r_A| = 0.913$
conical constant κ = 0.

16. An inverse telescopic wide angle lens comprising:

a diaphragm;

a front lens group of an integral positive or negative refractive power, positioned in the object side in front of said diaphragm and having a first lens group of a negative refractive power including a negative lens of which an image-side air-contacting surface is formed as an aspherical surface concave to the image side, and a second lens group of a positive refractive power positioned between said first lens group and said diaphragm; and a rear lens group of an integral positive refractive power, positioned behind said diaphragm and having plural lenses;

wherein said negative lens in said first lens group is so constructed that the absolute value of the refractive power of said concave surface on the optical axis is larger than that of the refractive power of the surface at the object side on the optical axis, that the curvature of said concave surface decreases monotonously with the distance from the optical axis, and that said aspherical surface satisfies a condition:

$$0.8 < |h_p/r_A| < 1.5$$

wherein $r_A$ is the paraxial radius of curvature of said aspherical surface, and $h_p$ is the height, from the optical axis, of the crossing point of the principal ray at the maximum image angle on said aspherical surface.

17. An inverse telescopic wide angle lens according to claim 16, wherein said first lens group is so constructed as to further satisfy a condition:

$$0.7 < |f_1/f| < 1.28$$

wherein f is the focal distance of the entire lens system, and $f_1$ is the focal distance of said first lens group.

* * * * *